United States Patent
Li et al.

(10) Patent No.: US 12,503,595 B2
(45) Date of Patent: Dec. 23, 2025

(54) POLYPHENYLENE ETHER-POLYAMIDE COMPOSITIONS, METHODS OF MANUFACTURE, AND USES THEREOF

(71) Applicant: SHPP GLOBAL TECHNOLOGIES B.V., Bergen op Zoom (NL)

(72) Inventors: Yi Li, Selkirk, NY (US); James Ross Fishburn, Selkirk, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 755 days.

(21) Appl. No.: 17/787,997

(22) PCT Filed: Dec. 15, 2020

(86) PCT No.: PCT/US2020/064998
§ 371 (c)(1),
(2) Date: Jun. 22, 2022

(87) PCT Pub. No.: WO2021/138035
PCT Pub. Date: Jul. 8, 2021

(65) Prior Publication Data
US 2023/0033209 A1    Feb. 2, 2023

Related U.S. Application Data

(60) Provisional application No. 62/956,040, filed on Dec. 31, 2019.

(30) Foreign Application Priority Data

Apr. 22, 2020    (EP) .................................... 20170916

(51) Int. Cl.
C08L 77/06    (2006.01)

(52) U.S. Cl.
CPC ......... *C08L 77/06* (2013.01); *C08L 2205/035* (2013.01)

(58) Field of Classification Search
CPC .... C08L 2205/035; C08L 71/12; C08L 83/12; C08L 77/06; C08L 53/025; C08L 71/02
See application file for complete search history.

(56) References Cited

U.S. PATENT DOCUMENTS 4,251,644 A * 2/1981 Joffrion .................... C08L 67/00
525/183
4,745,157 A * 5/1988 Yates, III .............. C08L 71/126
525/905

(Continued)

FOREIGN PATENT DOCUMENTS

CN    104419193 A    3/2015
EP    0866098 A1    9/1998

(Continued)

OTHER PUBLICATIONS

Septon 1001 product datasheet (Year: 2024).*

(Continued)

*Primary Examiner* — Randy P Gulakowski
*Assistant Examiner* — Virginia L Stonehocker
(74) *Attorney, Agent, or Firm* — CANTOR COLBURN LLP

(57) ABSTRACT

A composition includes particular amounts of a poly(phenylene ether), a poly(phenylene ether-siloxane), or a combination thereof; a polyamide composition, wherein the polyamide composition includes at least one polyamide having an amine end group content of less than 75 milliequivalents per gram; and at least one of a polystyrene-poly(ethylene-propylene) diblock copolymer impact modifier, or a polystyrene-poly(ethylene-butylene)-polystyrene triblock copolymer impact modifier, or a combination thereof, or an ethylene-propylene-diene monomer-modified (Continued)

polyamide, or a polyamide having an amine end group content of 75 to 140 milliequivalents per gram, as a part of the polyamide composition, or a combination thereof. The composition can be particularly useful for forming various articles.

14 Claims, 1 Drawing Sheet

(56) References Cited

U.S. PATENT DOCUMENTS

| | | |
|---|---|---|
| 5,248,728 A | 9/1993 | Lee, Jr. |
| 6,166,115 A | 12/2000 | Landa |
| 9,355,754 B2 | 5/2016 | Hong et al. |
| 2003/0092824 A1 | 5/2003 | Bastiaens et al. |
| 2005/0267248 A1 | 12/2005 | Van Bennekom et al. |

FOREIGN PATENT DOCUMENTS

| | | | |
|---|---|---|---|
| EP | 0943659 A2 | 9/1999 | |
| JP | 2012131977 A | 7/2012 | |
| WO | 03040224 A1 | 5/2003 | |
| WO | 2010008683 A2 | 1/2010 | |
| WO | WO2014087354 A1 * | 6/2014 | ............. C08L 77/00 |

OTHER PUBLICATIONS

International Search Report for the corresponding International Application No. PCT/US2020/064998; International Filing Date: Dec. 15, 2020; Date of Mailing: Apr. 13, 2021; 4 pages.

Written Opinion for the corresponding International Application No. PCT/US2020/064998; International Filing Date: Dec. 15, 2020; Date of Mailing: Apr. 13, 2021; 7 pages.

* cited by examiner

POLYPHENYLENE ETHER-POLYAMIDE COMPOSITIONS, METHODS OF MANUFACTURE, AND USES THEREOF

CROSS-REFERENCE TO RELATED APPLICATIONS

This application is a National Stage application of PCT/US2020/064998, filed Dec. 15, 2020, which claims priority to and the benefit of U.S. Application No. 62/956,040, filed on Dec. 31, 2019 and European Patent Application No. 20170916.9, filed Apr. 22, 2020, the contents of each of which are incorporated by reference herein in their entirety.

BACKGROUND OF THE INVENTION

This disclosure relates to polyphenylene ether/polyamide compositions, in particular compatibilized blends including polyphenylene ether and polyamide, their methods of manufacture, and articles containing the compositions.

Polyphenylene ethers have been blended with polyamides to provide compositions having a wide variety of beneficial properties such as heat resistance, chemical resistance, impact strength, hydrolytic stability, and dimensional stability. In some applications it is desirable to use poly(phenylene ether)/polyamide compositions with good low-temperature mechanical properties. Unfortunately, these properties can be difficult to achieve for articles with lower thicknesses while maintaining mechanical properties. Moreover, it is particularly difficult to achieve flame retardancy in glass fiber reinforced thermoplastic compositions, because the presence of the reinforcing filler alters the combustion behavior of the composition compared to non-reinforced compositions. In addition, the presence of glass fiber can significantly alter the ductility of a composition.

There accordingly remains a need in the art for polyphenylene ether/polyamide compositions with improved low temperature impact properties.

BRIEF SUMMARY

A composition includes 35 to 55 weight percent of a poly(phenylene ether), a poly(phenylene ether-siloxane), or a combination thereof; 35 to 65 weight percent of a polyamide composition, wherein the polyamide composition comprises at least one polyamide having an amine end group content of less than 75 milliequivalents per gram; 10 to 30 weight percent, preferably 14 to 24 weight percent, of a polystyrene-poly(ethylene-propylene) diblock copolymer impact modifier, or a polystyrene-poly(ethylene-butylene)-polystyrene triblock copolymer impact modifier, or a combination thereof; and optionally: 20 to 30 weight percent of an ethylene-propylene-diene monomer-modified polyamide, or 5 to 20 weight percent of a polyamide having an amine end group content of 75 to 140 milliequivalents per gram, as a part of the polyamide composition, or a combination thereof; wherein each amount is based on 100 weight percent of the composition.

Another aspect is an article comprising the composition in any of its variations.

Another aspect is a method of forming the composition, the method including combining the components of the above-described composition.

These and other aspects are described and illustrated in detail below.

BRIEF DESCRIPTION OF THE DRAWINGS

The following Figures are illustrative.

DETAILED DESCRIPTION OF THE INVENTION

Figure 1:
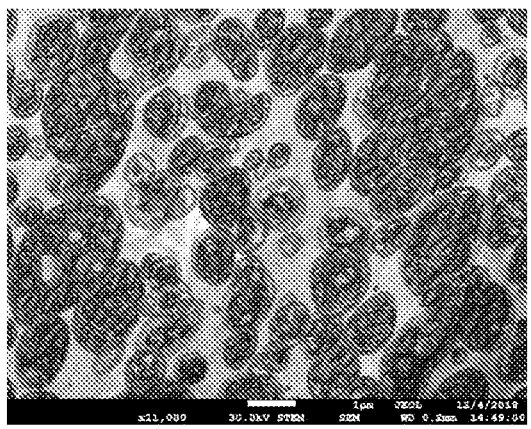
FIG. 1 is a scanning transmission electron microscopy (STEM) image of Example 14, containing 38 parts by weight (pbw) of a polyamide-6,6 and 35.6 pbw of polyphenylene ether (PPE).

The present inventors have found that improved polyphenylene ether/polyamide blends can be obtained using specific combinations of components and amounts of those components. Unexpectedly, a PPE/PA composition with a specific amine group content and/or a specific impact modifier can provide blends having improved low-temperature properties. Without being bound by theory, it is believed that the improved low-temperature impact properties are due to the improved distribution of PPE within the polyamide matrix.

In particular, a compatibilized blend composition includes a poly(phenylene ether), a poly(phenylene ether-siloxane), or a combination thereof; a polyamide composition that includes at least one polyamide having an amine end group content of less than 75 milliequivalents per gram; a polystyrene-poly(ethylene-propylene) diblock copolymer impact modifier, or a polystyrene-poly(ethylene-butylene)-polystyrene triblock copolymer impact modifier; and (a) an ethylene-propylene-diene monomer-modified polyamide; or (b) of a polyamide having an amine end group content of 75 to 140 milliequivalents per gram, as a part of the polyamide composition, or a combination of (a) and (b).

The blend compositions includes a polyphenylene ether (also referred to herein as "PPE"), wherein the PPE can be a poly(phenylene ether), a poly(phenylene ether-siloxane), or a combination thereof. The poly(phenylene ether) is a homopolymer or copolymer comprising phenylene ether units having the structure

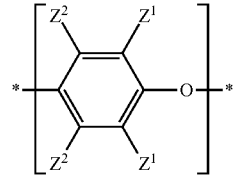

wherein each occurrence of $Z^1$ is independently halogen, unsubstituted or substituted $C_{1-12}$ hydrocarbyl, provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms. The poly(phenylene ether) can have aminoalkyl-containing end group(s), typically located in a position ortho to the hydroxy group. As one example, $Z^1$ can be a di-n- butylaminomethyl group formed by reaction of a terminal 3,5-dimethyl-1,4-phenyl group with the di-n-butylamine component of an oxidative polymerization catalyst. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a random copolymer, a graft copolymer, or a block copolymer, as well as a combination thereof. In an aspect, the poly(phenylene ether) is a homopolymer, preferably poly(2,6-dimethyl-1,4-phenylene ether).

In an aspect, the poly(phenylene ether) can be a poly(phenylene ether-siloxane) block copolymer that includes blocks containing phenylene ether units as described above and blocks containing siloxane units having the structure

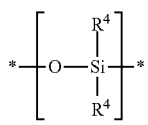

wherein each occurrence of $R^4$ is independently $C_{1-12}$ hydrocarbyl or $C_{1-12}$ hydrocarbyloxy. In an aspect, each occurrence of $R^4$ is methyl. Methods for the preparation of poly(phenylene ether)-polysiloxanes include those described in International Patent Application Publication No. WO 2010/008683 A2 of F. Toublan et al. In an aspect, the poly(phenylene ether-siloxane) block copolymer can be formed by oxidative copolymerization of a monohydric phenol that comprises 2,6-dimethylphenol and a hydroxyaryl-terminated polysiloxane having the structure

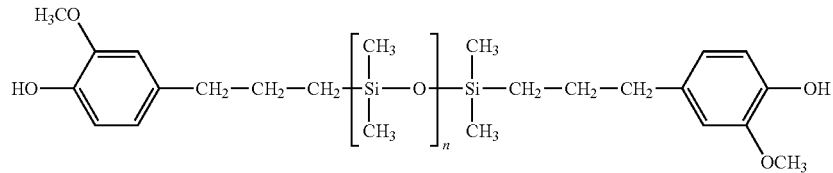

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al.

In an aspect, the PPE (i.e., the poly(phenylene ether) or the poly(phenylene ether-siloxane)) has an intrinsic viscosity of 0.2 to 1 deciliter per gram measured by Ubbelohde viscometer at 25° C. in chloroform. Within this range, the poly(phenylene ether) intrinsic viscosity can be 0.3 to 0.5 deciliter per gram, specifically 0.35 to 0.55 deciliter per gram.

In an aspect, the PPE is a poly(phenylene ether) that includes 2,6-dimethyl-1,4-phenylene ether units, 2,3,6-trimethyl-1,4-phenylene ether units, or a combination thereof. In a specific aspect, the poly(phenylene ether) is a poly(2,6-dimethyl-1,4-phenylene ether) having an intrinsic viscosity of 0.2 to 0.6 deciliter per gram, measured by Ubbelohde viscometer at 25° C. in chloroform. Within the range of 0.2 to 0.6 deciliter per gram, the poly(2,6-dimethyl-1,4-phenylene ether) the intrinsic viscosity can be 0.3 to 0.5 deciliter per gram, more preferably 0.35 to 0.45 deciliter per gram.

The blend compositions include the poly(phenylene ether) in an amount of 35 to 55 weight percent, based on the total weight of the composition. Within this range, the PPE amount can be 30 to 40 weight percent, or 32 to 38 weight percent, or 33 to 36 weight percent, or 33 to 37 weight percent.

In addition to poly(phenylene ether), the composition further includes a polyamide composition that includes one or more different polyamides. Polyamides, also known as nylons, are polymers containing amide (i.e., —C(=O) NH—) linking groups, for example as described in U.S. Pat. No. 4,970,272 to Gallucci. Polyamides that can be used include polyamide-6, polyamide-6,6, polyamide-4, polyamide-4,6, polyamide-12, polyamide-6,10, polyamide 6,9, polyamide-6,12, polyamide 9T, polyamide 6/6T and polyamide 6,6/6T with a triamine content below 0.5 weight percent, or a combination thereof. In an aspect, the polyamide comprises polyamide-6, polyamide-6,6, or a combination thereof. Polyamide-6 and polyamide-6,6 are commercially available from a number of sources and methods for their preparation are known. For example, polyamides can be obtained by a number of well-known processes such as those described in U.S. Pat. Nos. 2,071,250, 2,071,251, 2,130,523, and 2,130,948 to Carothers; U.S. Pat. Nos. 2,241, 322 and 2,312,966 to Hanford; and U.S. Pat. No. 2,512,606 to Bolton et al.

The polyamide composition includes a polyamide having an amine end group content of less than 75 milliequivalents per gram (meq/g), referred to herein for convenience as a "low amine polyamide". The low amine polyamide can have an amine end group concentration of 5 to 75 milliequivalents per gram, or less than 70 milliequivalents per gram or 10 to 70 milliequivalents per gram, or 15 to 60 milliequivalents per gram. Amine end group content can be determined by dissolving the polyamide in a suitable solvent and titrating with 0.01 normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

The compositions can optionally further include at least one of a polyamide having an amine end group content of 75 to 140 meq/g, or 85 to 120 milliequivalents per gram, as a part of the polyamide composition; or a specific impact modifier as further described below; or a combination of the polyamide having an amine end group content of 75 to 140 meq/g and one or more of the specific impact modifiers.

Polyamides having an amine end group content of 75 to 140 meq/g are commercially available. The amine group content can be measured as described above. The amount of this polyamide is included as the polyamide component as a whole, and is described in further detail below.

In an aspect, the polyamide composition comprises at least two different polyamides, wherein one polyamide has an amine content of less than 75 milliequivalents, and another polyamide has an amine content of 75 to 140 milliequivalents per gram, preferably an amine content of 85 to 120 milliequivalents per gram.

The polyamide composition can be included in the composition in an amount of 35 to 65 weight percent. Within this range, the polyamide composition can be present in an amount of 38 to 54 weight percent, or 40 to 48 weight percent, or 42 to 50 weight percent, or 44 to 48 weight percent, or 40 to 50 weight percent. In a specific aspect, the polyamide having an amine end group content of 75 to 120 milliequivalents per gram can be present, and can account for 20 to 40 weight percent, preferably 20 to 35 weight percent, more preferably 20 to 30 weight percent, of all the polyamide in the composition.

In addition to the poly(phenylene ether) and the polyamide composition, the composition of the present disclosure further includes an impact modifier. Impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. Thus, a wide variety of impact modifiers are known in the art, but the present inventors have found that only certain impact modifiers provide the desired low-temperature properties. In particular, the composition further includes a poly styrene-poly(ethylene-propylene) diblock copolymer impact modifier, or a polystyrene-poly(ethylene-butylene)-polystyrene triblock copolymer impact modifier, or a combination thereof; and optionally an ethylene-propylene-diene monomer-modified polyamide. In an aspect a combination of the polystyrene-poly(ethylene-propylene) diblock copolymer impact modifier or the polystyrene-poly(ethylene-butylene)-polystyrene triblock copolymer impact modifier can be used together with the ethylene-propylene-diene monomer-modified polyamide.

The polystyrene-poly(ethylene-propylene) diblock copolymer impact modifier and the polystyrene-poly(ethylene-butylene)-poly styrene triblock copolymer include a hydrogenated block copolymer of styrene and a conjugated diene. For brevity, this component is referred to as the "hydrogenated block copolymer". The hydrogenated block copolymer is a copolymer comprising (A) at least one block derived from styrene and (B) at least one block derived from a conjugated diene, in which the aliphatic unsaturated group content in the block (B) is at least partially reduced by hydrogenation. In an aspect, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In an aspect, the hydrogenated block copolymer has a tapered linear structure. In an aspect, the hydrogenated block copolymer has a non-tapered linear structure. In an aspect, the hydrogenated block copolymer comprises a (B) block that comprises random incorporation of alkenyl aromatic monomer. Linear block copolymer structures include diblock (A-B block) and triblock (A-B-A block) wherein the molecular weight of each (A) block can be the same as or different from that of other (A) blocks, and the molecular weight of each (B) block can be the same as or different from that of other (B) blocks. In an aspect, the hydrogenated block copolymer is a diblock copolymer, a triblock copolymer, or a combination thereof.

The hydrogenated block copolymer can comprise 10 to 90 weight percent of poly(styrene) content and 90 to 10 weight percent of hydrogenated poly(conjugated diene) content, based on the weight of the hydrogenated block copolymer. In an aspect, the hydrogenated block copolymer is a low poly(styrene)-content hydrogenated block copolymer in which the poly(styrene) content is 10 to less than 40 weight percent, or 20 to 35 weight percent, or 25 to 35 weight percent, or 30 to 35 weight percent, all based on the weight of the low poly(styrene)-content hydrogenated block copolymer. In an aspect, the hydrogenated block copolymer is a high poly(styrene)-content hydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic) content hydrogenated block copolymer.

The conjugated diene used to prepare the hydrogenated block copolymer can be a $C_{4-20}$ conjugated diene. Suitable conjugated dienes include, for example, 1,3-butadiene, 2-methyl-1,3-butadiene, 2-chloro-1,3-butadiene, 2,3-dimethyl 1,3 butadiene, 1,3-pentadiene, 1,3-hexadiene, and the like, and combinations thereof. In an aspect, the conjugated diene is 1,3-butadiene, 2 methyl-1,3-butadiene, or a combination thereof. In an aspect, the conjugated diene is 1,3-butadiene.

In an aspect, the hydrogenated block copolymer has a weight average molecular weight of 40,000 to 400,000 grams per mole (g/mol). The number average molecular weight and the weight average molecular weight can be determined by gel permeation chromatography and based on comparison to polystyrene standards. In an aspect, the hydrogenated block copolymer has a weight average molecular weight of 200,000 to 400,000 g/mol, or 220,000 to 350,000 g/mol. In an aspect, the hydrogenated block copolymer has a weight average molecular weight of 40,000 to 200,000 g/mol, or 40,000 to 180,000 g/mol, or 40,000 to 150,000 g/mol.

In an aspect, the hydrogenated block copolymer excludes the residue of monomers other than the styrene and the conjugated diene. In an aspect, the hydrogenated block copolymer consists of blocks derived from the styrene and the conjugated diene. It does not comprise grafts formed from these or any other monomers. It also consists of carbon and hydrogen atoms and therefore excludes heteroatoms. In an aspect, the hydrogenated block copolymer includes the residue of one or more acid functionalizing agents, such as maleic anhydride. In an aspect, the hydrogenated block copolymer comprises a polystyrene poly(ethylene-butylene)-polystyrene triblock copolymer.

Methods for preparing hydrogenated block copolymers are known in the art and many hydrogenated block copolymers are commercially available. Commercially available hydrogenated block copolymers include the polystyrene-poly(ethylene-propylene) diblock copolymers available from Kraton Performance Polymers Inc. as KRATON™ G1701 (having 37 weight percent polystyrene) and G1702 (having 28 weight percent polystyrene); the polystyrene-poly(ethylene-butylene)-polystyrene triblock copolymers available from Kraton Performance Polymers Inc. as KRATON™ G1641 (having 33 weight percent polystyrene), G1650 (having 30 weight percent polystyrene), G1651 (having 33 weight percent polystyrene), and G1654 (having 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include poly styrene-poly(ethylene-butylene)-poly styrene (SEBS) triblock copolymers available from Dynasol as CALPRENE™ H6140 (having 31 weight percent polystyrene), H6170 (having 33 weight percent polystyrene), H6171 (having 33 weight percent polystyrene), and H6174 (having 33 weight percent polystyrene); and from Kuraray as SEPTON™ 8006 (having 33 weight percent polystyrene) and 8007 (having 30 weight percent polystyrene); polystyrene-poly(ethylene-butylene-styrene)-polystyrene tapered block copolymers available from Kraton Performance Polymers as KRATON™ A1535 (having 56.3-60.3 weight percent polystyrene) and A1536 (having 37-44 weight percent polystyrene); polystyrene-poly(ethylene-propylene)-polystyrene (SEPS) copolymers available from Kuraray as SEPTON™ 2006 (having 35 weight percent polystyrene) and 2007 (having 30 weight percent polystyrene); and oil-extended compounds of these hydrogenated block copolymers available from Kraton Performance Polymers Inc. as KRATON™ G4609 (containing 45% mineral oil, and the SEBS having 33 weight percent polystyrene) and G4610 (containing 31% mineral oil, and the SEBS having 33 weight percent polystyrene); and from Asahi as TUFTEC™ H1272 (containing 36% oil, and the SEBS having 35 weight percent polystyrene).

However, it has been found by the inventors hereof that only certain of the foregoing commercially available hydrogenated block copolymer are effective to provide low temperature mechanical properties. For example, high molecular weight or high vinyl content SEBS do not provide improved low-temperature mechanical properties. In particular, hydrogenated polystyrene-poly(ethylene-propylene) diblock copolymer, having a styrene content of 26.2-29 wt % (KRATON G1702) is useful. Thus in an aspect, the polystyrene-poly(ethylene-propylene) diblock copolymer impact modifier can be present, and can preferably have a styrene content 20 to 35 weight percent, or 25 to 30 weight percent.

Other than the hydrogenated block copolymer, it has been found that compositions containing an elastomer-modified graft copolymer comprising (i) an elastomeric (i.e., rubbery) polymer substrate having a Tg less than 10° C., more preferably less than −10° C., or more preferably −40° to −80° C., and (ii) a rigid polymeric superstrate grafted to the elastomeric polymer substrate can be useful. In particular, ethylene-propylene-diene monomer rubbers (EPDM) can be used. In a specific aspect, ethylene-propylene-diene monomer-modified polyamide can provide desirable low-temperature mechanical properties. Such impact modifiers are also known and commercially available.

The polystyrene-poly(ethylene-propylene) diblock copolymer impact modifier, or the polystyrene-poly(ethylene-butylene)-polystyrene triblock copolymer impact modifier, or the combination thereof can be included in the composition in an amount of 10 to 30 weight percent. Within this range, the amount can be 14 to 24 weight percent. In an aspect, the composition can include 10 to 28 weight percent, or 14 to 24 weight percent, of the polystyrene-poly(ethylene-propylene) diblock copolymer impact modifier. In an aspect, the composition can include 12 to 24 weight percent, or 15 to 22 weight percent, of the polystyrene-poly(ethylene-propylene) diblock copolymer impact modifier. In an aspect, the composition can include 24 to 30 weight percent of the ethylene-propylene-diene monomer-modified polyamide. In an aspect, the composition can include 2 to 10 weight percent, preferably 3 to 8 weight percent, of the ethylene-propylene-diene monomer impact modifier.

The relative amount of each component can be adjusted to provide the desired combination of properties. As is understood by one of skill in the art, the amount of each component is selected such that they total 100 weight percent.

The composition can optionally further comprise an additive composition, comprising one or more additives selected to achieve a desired property, with the proviso that the additives are also selected so as to not significantly adversely affect a desired property of the composition. The additive composition or individual additives can be mixed at a suitable time during the mixing of the components for forming the composition. The additive composition can include flow modifier, filler (e.g., a particulate polytetrafluoroethylene (PTFE), glass, carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination thereof. The additives are used in the amounts generally known to be effective. For example, the total amount of the additive composition (other than any impact modifier, filler, or reinforcing agent) can be 0.001 to 10.0 weight percent, or 0.01 to 5 weight percent, each based on the total weight of the polymer in the composition. In an aspect the composition can exclude additives not specifically disclosed herein.

Fillers can include reinforcing fillers (including metal fibers, metallized inorganic fibers, metallized synthetic fibers, glass fibers, graphite fibers, carbon fibers, ceramic fibers, mineral fibers, and combinations thereof), electrically conductive fillers (including carbon fibers, carbon nanotubes, and metal fibers), antimicrobial fillers (including silver sulfate and copper sulfate), damping fillers (including epoxy resins and borax), thermally conductive fillers (including aluminum fibers, graphite fibers, boron nitride, and aluminum nitride), and combinations thereof. In an aspect, the filler comprises glass fibers. Glass fibers include those based on E, A, C, ECR, R, S, D, and NE glasses, as well as quartz. The glass fiber can have a diameter of 2 to 30 micrometers, specifically 5 to 25 micrometers, more specifically 10 to 15 micrometers. The length of the glass fibers before compounding can be 0.3 to 5 millimeters, specifically 0.5 to 4 millimeters. The glass fiber can, optionally, include a so-called adhesion promoter to improve its compatibility with the thermoplastic composition. Adhesion promoters include chromium complexes, silanes, titanates, zirco-aluminates, propylene maleic anhydride copolymers, reactive cellulose esters and the like. Suitable glass fiber is commercially available from suppliers including, for example, Owens Corning, Johns Manville, and PPG Industries In an aspect no filler or glass fibers are present. In an aspect, no conductive fillers are present in the composition.

In an aspect, a compatibilizing agent can be used to facilitate formation of a compatibilized blend of the polyamide and the poly(phenylene ether). As used herein, the term "compatibilizing agent" refers to a polyfunctional compound that interacts with the poly(phenylene ether), the polyamide, or both. This interaction can be chemical (for example, grafting) and/or physical (for example, affecting the surface characteristics of the dispersed phases). In either instance the resulting polyamide-poly(phenylene ether) blend exhibits improved compatibility, particularly as evidenced by enhanced impact strength, mold knit line strength, and/or tensile elongation. Such compatibilizing agents are known, and can include, for example both a carbon-carbon double bond and at least one carboxylic acid, anhydride, epoxy, imide, amide, ester group or functional equivalent thereof. Other known compatibilizing agents include a group such as hydroxy, alkoxy, aryloxy, or acyloxy, and at least two groups, each of which may be the same or different, and can be a carboxylic acid, acid halide, anhydride, acid halide anhydride, ester, orthoester, amide, imido, amino, or a salt thereof. Examples compatibilizing agents include maleic acid; maleic anhydride; fumaric acid; maleic hydrazide; dichloro maleic anhydride; unsaturated dicarboxylic acids (e.g. acrylic acid, butenoic acid, methacrylic acid, t-ethylacrylic acid, pentenoic acid; citric acid, malic acid, agaricic acid; acetyl citrate, mono- and/or distearyl citrates, N,N'-diethyl citric acid amide; N-phenyl citric acid amide; N-dodecyl citric acid amide; N,N'-didodecyl citric acid amide and N-dodecyl malic acid. Derivates include the salts thereof, including the salts with amines and the alkali and alkaline metal salts. Exemplary suitable salts include calcium malate, calcium citrate, potassium malate, and potassium citrate. In an aspect, the compatibilizing agent comprises citric acid anhydride, fumaric acid, or a combination thereof. In an aspect, compatibilizing agents other than citric acid anhydride or fumaric acid are not present in the composition.

In a specific aspect, the composition comprises 30 to 40 weight percent, preferably 32 to 38 weight percent, more preferably 33 to 36 weight percent, of the poly(phenylene ether); 38 to 54 weight percent, preferably 40 to 48 weight percent, of a polyamide composition, wherein the polyamide composition comprises the polyamide having an amine end group content of less than 70 milliequivalents per gram and a polyamide having an amine end group content of 75 to 140 milliequivalents per gram; and 10 to 28 weight percent, preferably 14 to 24 weight percent, of the polystyrene-poly(ethylene-propylene) diblock copolymer impact modifier.

In a specific aspect, the composition comprises 33 to 37 weight percent of the poly(phenylene ether), 42 to 50 weight percent, preferably 44 to 48 weight percent, of the polyamide composition, and the polyamide having an amine end group content of 75 to 120 milliequivalents per gram is present in an amount 8 to 35 weight percent, preferably 12 to 26 weight percent, and 12 to 24 weight percent, preferably 15 to 22 weight percent, of the polystyrene-poly(ethylene-propylene) diblock copolymer impact modifier.

In a specific aspect, the composition comprises 30 to 40 weight percent, preferably 32 to 38 weight percent, more preferably 33 to 36 weight percent, of the poly(phenylene ether); 38 to 54 weight percent, preferably 40 to 48 weight percent, of a polyamide composition, wherein the polyamide composition comprises the polyamide having an amine end group content of less than 70 milliequivalents per gram and a polyamide having an amine end group content of 75 to 140 milliequivalents per gram; 10 to 28 weight percent, preferably 14 to 24 weight percent, of the polystyrene-poly(ethylene-propylene) diblock copolymer impact modifier; and 2 to 10 weight percent, preferably 3 to 8 weight percent, of the ethylene-propylene-diene monomer impact modifier.

In a specific aspect, the composition comprises 33 to 37 weight percent of the poly(phenylene ether), 42 to 50 weight percent, preferably 44 to 48 weight percent, of the polyamide composition, and the polyamide having an amine end group content of 75 to 140 milliequivalents per gram is present in an amount 8 to 35 weight percent, preferably 12 to 26 weight percent, 12 to 24 weight percent, preferably 15 to 22 weight percent, of the polystyrene-poly(ethylene-propylene) diblock copolymer impact modifier, and 2 to 10 weight percent, preferably 3 to 8 weight percent, of the ethylene-propylene-diene monomer impact modifier.

In a specific aspect, the composition comprises 30 to 40 weight percent, preferably 32 to 38 weight percent, more preferably 33 to 36 weight percent, of the poly(phenylene ether); 40 to 50 weight percent, preferably 42 to 48 weight percent of the polyamide composition; 10 to 28 weight percent, preferably 14 to 24 weight percent, of the polystyrene-poly(ethylene-propylene) diblock copolymer impact modifier; and 2 to 10 weight percent, preferably 3 to 8 weight percent, of an ethylene propylene diene monomer impact modifier.

In a specific aspect, the composition comprises 30 to 40 weight percent, preferably 32 to 38 weight percent, more preferably 33 to 36 weight percent, of the poly(phenylene ether); 40 to 50 weight percent, preferably 42 to 48 weight percent of the polyamide composition; 10 to 28 weight percent, preferably 14 to 24 weight percent, of the polystyrene-poly(ethylene-propylene) diblock copolymer impact modifier; and 2 to 10 weight percent, preferably 3 to 8 weight percent, of an ethylene propylene diene monomer impact modifier, and the polyamide composition comprises at least two different polyamides, wherein one polyamide has an amine content of less than 75 milliequivalents, and another polyamide has an amine content of 75 to 140 milliequivalents per gram, preferably an amine content of 85 to 120 milliequivalents per gram.

The composition of the present disclosure can exhibit one or more advantageous properties. For example, a molded sample comprising the composition can exhibit a desirable heat distortion temperature (HDT), notched Izod impact strength, tensile modulus, or ductility. For example, a molded sample of the composition can have at least one of a heat distortion temperature from 164° C. to 174° C., measured in accordance with ISO 75 at 1.8 MPa; an Izod notched impact strength from 45 to 70 kJ/m², preferably from 55 to 70 kJ/m², measured in accordance with ISO 180 at −30° C.; a tensile modulus of 1700 to 2200 MPa measured in accordance with ISO 527 at −30° C.; or ductility as measured in accordance with ASTM D2763 at 3.3 m/s at −30° C., where the molded sample is treated for 40 hours at 40° C./95% relative humidity then for 144 hours at 23° C./65% relative humidity. For example, a molded sample of the composition can have at least one of a heat distortion temperature from 164° C. to 180° C., measured in accordance with ISO 75 at 1.8 MPa; an Izod notched impact strength from 32 kJ/m² to 64 kJ/m², preferably from 40 kJ/m² to 60 kJ/m², measured in accordance with ISO 180 at −30° C.; a tensile modulus of 2100 MPa to 2600 MPa measured in accordance with ISO 527 at −30° C.; or ductility as measured in accordance with ASTM D2763 at 3.3 m/s at −30° C., where the molded sample is treated for 40 hours at 40° C./95% relative humidity then for 144 hours at 23° C./65% relative humidity.

In an aspect, the composition comprises: 30 to 40 weight percent, preferably 32 to 38 weight percent, more preferably 33 to 36 weight percent, of the poly(phenylene ether); 40 to 50 weight percent, preferably 42 to 48 weight percent of the polyamide composition; 10 to 28 weight percent, preferably 14 to 24 weight percent, of the polystyrene-poly(ethylene-propylene) diblock copolymer impact modifier; and 2 to 10 weight percent, preferably 3 to 8 weight percent, of an ethylene propylene diene monomer impact modifier. For example in this aspect, the polyamide composition comprises at least two different polyamides, wherein one polyamide has an amine content of less than 75 milliequivalents, and another polyamide has an amine content of 75 to 140 milliequivalents per gram, preferably an amine content of 85 to 120 milliequivalents per gram. In this aspect, a molded sample of the composition has at least one, at least two, or at least three of the following properties: a heat distortion temperature from 164° C. to 174° C., measured in accordance with ISO 75 at 1.8 MPa; an Izod notched impact strength from 45 to 70 kJ/m$^2$, preferably from 55 to 70 kJ/m$^2$, measured in accordance with ISO 180 at –30° C.; a tensile modulus of 1700 to 2200 MPa measured in accordance with ISO 527 at –30° C.; or ductility as measured in accordance with ASTM D2763 at 3.3 m/s at –30° C., where the molded sample is treated for 40 hours at 40° C./95% relative humidity then for 144 hours at 23° C./65% relative humidity.

A composition according to the present disclosure can comprise 35 to 55 weight percent of a poly(phenylene ether), a poly(phenylene ether-siloxane), or a combination thereof; 35 to 65 weight percent of a polyamide composition, wherein the polyamide composition comprises at least one polyamide having an amine end group content of less than 75 milliequivalents per gram; 10 to 30 weight percent, preferably 14 to 24 weight percent, of a polystyrene-poly(ethylene-propylene) diblock copolymer impact modifier, or a polystyrene-poly(ethylene-butylene)-polystyrene triblock copolymer impact modifier, or a combination thereof, and optionally 20 to 30 weight percent of an ethylene-propylene-diene monomer-modified polyamide, or 5 to 20 weight percent of a polyamide having an amine end group content of 75 to 140 milliequivalents per gram, as a part of the polyamide composition, or a combination thereof; wherein each amount is based on 100 weight percent of the composition. The polystyrene-poly(ethylene-propylene) diblock copolymer impact modifier can have a styrene content 20 to 35 weight percent, or 25 to 30 weight percent. The ethylene-propylene-diene monomer-modified polyamide can be present in an amount of 24 to 30 weight percent based on 100 weight percent of the composition. The polyamide having an amine end group content of 75 to 140 milliequivalents per gram can be present, and can account for 20 to 40 weight percent, preferably 20 to 35 weight percent, more preferably 20 to 30 weight percent, of all the polyamide in the composition. The ethylene-propylene-diene monomer-modified polyamide can be present, and the composition can comprise 2 to 10 weight percent, preferably 3 to 8 weight percent, of the ethylene-propylene-diene monomer impact modifier.

Another aspect is an article comprising the composition in any of its above-described variations. Such articles include components employed in the interiors of vehicles including automobiles, aircraft, ships, trains, and subway cars. A specific article is aerospace interior paneling.

The composition can be formed by any method that is generally known. For example, the composition can be formed by combining the components of the composition. In an aspect, the components of the composition can be dry blended, and the dry blend can be added into an upstream port of an extruder. The dry blend can then be melt mixed. In an aspect, the polyamide and, when present, any filler, can be added to the melt mix using separate downstream feeders. Typical melt mixing temperatures can be 250 to 315° C. Molded articles can be formed from the composition, for example, by injection molding or extrusion.

The present disclosure is further illustrated by the following non-limiting examples.

EXAMPLES

The materials shown in Table 1 were used in the Examples.

TABLE 1

| Component | Description (Trade Name) | Source |
|---|---|---|
| PPE | Poly(2,6-dimethyl-1,4-phenylene ether), CAS Reg. No. 25134-01-4, having an intrinsic viscosity of 0.40 deciliter per gram as measured in chloroform at 25° C. and a weight average molecular weight of 56,200 Da grams per mole relative to polystyrene standards (NORYL ™ PPE ™ 640) | SABIC |
| PPE-siloxane | A mixture of poly(2,6-dimethyl-1,4-phenylene ether) (CAS Reg. No. 24938-67-8) and poly(2,6-dimethyl-1,4-phenylene ether-poly dimethylsiloxane block copolymer (CAS Reg. No. 1202019-56-4), the mixture having a polysiloxane content of 5 weight percent and an intrinsic viscosity of 0.40 deciliter per gram as measured in chloroform at 25° C.; prepared according to the procedure of U.S. Patent No. 8,017,697 to Carrillo et al., Example 16. | SABIC |
| PA66-P | Polyamide-6,6, CAS Reg. No. 32131-17-2, having an amine content of 52-56 meq/g a relative viscosity of 46-50 measured according to ASTM D789-07e1 in 90% formic acid; obtained in pellet form as RD963 | Custom Resins |
| PA66-HF | Polyamide-6,6, CAS Reg. No. 32131-17-2, having a relative viscosity of 34-38 measured according to ASTM D789-07el in 90% formic acid; obtained in pellet form as Vydyne21ZLV | Ascend |
| PA6-HA | High amine polyamide-6 with a total amine content of 90-110 meq/g. | Custom Resins |
| PA66-IM | Impact-modified polyamide-6,6, containing 80 wt % of polyamide 6,6 and 20 wt % of EPDM (ROYALTUF ®), obtained as THERMOTUFF V1000-BK1A905 | SABIC |
| SEBS-HMW | High molecular weight polystyrene-poly(ethylene-butylene)-polystyrene triblock copolymer, CAS Reg. No. 66070-58-4, having a polystyrene content of 30-33 weight percent, essentially no melt flow measured according to ASTM D 1238-13 at 230° C. and 5 kilogram load, and a weight average molecular weight of 240,000-301,000 g/mol (KRATON ™ G1651) | Kraton |

TABLE 1-continued

| Component | Description (Trade Name) | Source |
|---|---|---|
| SEP-HS | High styrene hydrogenated polystyrene-poly(ethylene-propylene) diblock copolymer, 34.7-38.5 wt % polystyrene (KRATON™ G1701) | Kraton. |
| SEP-TP | Thermoplastic elastomer hydrogenated polystyrene-poly(ethylene-propylene) diblock copolymer, 26.2-29 wt % styrene (KRATON™ G1702) | Kraton |
| SEBS-1 | (ERS MD 6958) | Kraton |
| SEBS-2 | High vinyl hydrogenated styrene block copolymer impact modifier (polystyrene-poly(ethylene-butylene)-polystyrene), having a weight average molecular weight in the range of 370,000-390,000 g/mol (ERS MD 6958) | Kraton |
| SBS | Styrene-butadiene-styrene block copolymer available as D1101 | Kraton |
| MBS-1 | Core-shell rubber available as MBS Kane Ace M731PL | Kaneka |
| MBS-2 | Core-shell rubber available as Kane Ace MR01 | Kaneka |
| Si-Acrylate | Silicone-acrylic rubber available as Metablen S2001 | Mitsubishi Chemical |
| Ionomer | Ionomer of ethylene acid copolymer, available as Surlyn 8940 | DuPont |
| IM-1 | Amorphous polyamide impact modifier available as SELAR 3426 | DuPont |
| IM-2 | Polyamide-compatibilized core-shell impact modifier available as MBS Metablen S2200 | Mitsubishi Chemical |
| IM-3 | Polyamide-compatibilized core-shell Silicone-acrylic impact modifier available as METABLEN E870. | Mitsubishi Chemical |
| CAA | Citric acid anhydride | |
| PETS | Pentaerythritol tetrastearate | |
| CuI | Cuprous iodide | |
| KI | Potassium iodide | |
| AO | Hindered phenolic antioxidant, octadecyl 3-(3',5'-di-tert-butyl-4'-hydroxyphenyl)propionate, CAS Reg. No. 2082-79-3 (IRGANOX 1076). | Ciba |
| FA | Fumaric Acid | |

The compositions of the following examples were compounded on a Toshiba TEM-37BS 30-millimeter twin screw extruder in a single pass. All components except polyamide (except where specifically noted) were added at the feed throat of the extruded, and polyamides were added from a downstream side feeder. The extruder temperature settings (zones from upstream to downstream) were 240-270-290-290-290-290-290-290-280° C. and a die temperature of 255° C. The screw rotation rate was 300 revolutions per minute (rpm). The extrudate was cooled in a water bath and pelletized. Pellets were conditioned at 120° C. for 3 hours prior to injection molding or extrusion molding.

Prior to molding the pellets were pre-dried at 110° C. for 2-4 hrs. Molding of samples was performed on an 85 Van Dorn injection molding machine with temperature settings of 260-260-260-260° C. (from throat to nozzle) and a mold temperature of 70° C.

Physical properties were measured using ASTM or ISO test methods as shown in Table 2. Unless specified otherwise, the test standards set forth herein are the most recent standard as of the application filing date. All samples were tested as molded unless indicated otherwise in the tables below.

TABLE 2

| Property | Standard | Conditions | Specimen Type | Units |
|---|---|---|---|---|
| Heat distortion temperature (HDT) | ISO 75 | 5.5 Joule hammer, using the flat side of 4 mm thick ISO bars and a load of 1.8 MPa (A/f). | Multi-purpose ISO 3167 Type A specimen, 4 mm thick | ° C. |
| Multiaxial impact (MAI) | ASTM D3763 | −10, −5, 0, or 23° C., 3.3 meters/second | 4-inch diameter Dynatup disc, 3.2 mm thick | Rating |
| Izod notched impact (INI) | ISO 180 | −10, −5, 0, or 23° C., 5 foot pounds/foot | Bar, 80 × 4 × 10 mm | kJ/m$^2$ |
| Izod Unnotched Impact (IUnI) | ASTM D256 | −10, −5, 0, or 23° C., 5 foot pounds/foot | Bar, 80 × 4 × 10 mm | kJ/m$^2$ |
| Flexural modulus | ISO 178 | | Multi-purpose ISO 3167 Type A specimen | MPa |
| Flexural strength | ISO 178 | | Multi-purpose ISO 3167 Type A specimen | MPa |
| Tensile modulus | ISO 527 | 50 mm/minute | Multi-purpose ISO 3167 Type A specimen, 4 mm thick | MPa |
| Tensile stress at break | ISO 527 | 50 mm/min | Multi-purpose ISO 3167 Type A specimen, 4 mm thick | |
| Density | ASTMD 792 | | | g/cm3 |
| Vicat softening temperature (Vicat) | ISO 306 | rate A/50 | Bar, 80 × 4 × 10 mm | ° C. |
| Melt flow rate (MFR) | ISO 1133 | 280° C., 2.16 kg | Pellet | g/10 min |

In the multiaxial impact (Dynatup) testing, samples are given a rating as follows: B=brittle, D=ductile, D/B=ductile/brittle.

In the following Tables and discussion, "CEx" refers to a comparative Example and "Ex" refers to an Example. The amount of each component is in parts by weight (pbw) based on the total weight of the composition, and may not total 100.

The following set of experiments were directed to investigating improving low temperature properties by modifying the PPE matrix phase. In particular, the effect of impact modifier type and amount in the PPE matrix phase was investigated, as well as use of a PPE-siloxane copolymer.

Examples 1-5

In these examples, two types of a hydrogenated polybutadiene rubber were tested in various amounts as a replacement for PPE in a PPE/polyamide base composition, to determine their effect on low-temperature impact strength and other properties. Compositions and testing results are shown in Table 3. As can be seen in Table 3, two comparative Examples (CEx1a and CEx1b) having the same formulation were prepared and tested. Values obtained for each comparative Example were similar The two impact modifiers were a hydrogenated, high-styrene polystyrene-poly(ethylene-propylene) diblock copolymer (SEP-HS) and a high molecular weight polystyrene-poly(ethylene-butylene)-polystyrene triblock copolymer (SEB-HMW), and were tested in amounts of 15 pbw (CEx1a and 1b), 18 pbw (Ex2 and Ex5), and 22 pbw (Ex3, Ex4). Different ratios of SEP-TP to SEBS-HMW (8 to 7 (CEx1a and 1b), 11 to 4 (Ex4), and 15 to 0 (Ex5)) were studied at a total impact modifier content of 15 wt %.

TABLE 3

| Component | Unit | CE1a | CE1b | Ex2 | Ex3 | Ex4 | Ex5 |
|---|---|---|---|---|---|---|---|
| PPE | pbw | 35.6 | 35.6 | 32.6 | 28.6 | 35.6 | 35.6 |
| PA66-P | pbw | 48 | 48 | 48 | 48 | 48 | 48 |
| SEP-HS | pbw | 8 | 8 | 11 | 15 | 11 | 15 |
| SEBS-HMW | pbw | 7 | 7 | 7 | 7 | 4 | 0 |
| PETS | pbw | 0.3 | 0.3 | 0.3 | 0.3 | 0.3 | 0.3 |
| CuI | pbw | 0.01 | 0.01 | 0.01 | 0.01 | 0.01 | 0.01 |
| CAA | pbw | 0.7 | 0.7 | 0.7 | 0.7 | 0.7 | 0.7 |
| AO | pbw | 0.3 | 0.3 | 0.3 | 0.3 | 0.3 | 0.3 |
| KI | pbw | 0.15 | 0.15 | 0.15 | 0.15 | 0.15 | 0.15 |
| Properties[1] | | | | | | | |
| HDT, 0.45 MPa | °C. | 183 | 179 | 173 | 165 | 176 | 175 |
| MAI, 3.3 m/s, 0° C. | Rating | D | D | D | D | D | D |
| MAI, 3.3 m/s, −5° C. | Rating | D/B | D/B | D | D | D | D |
| MAI, 3.3 m/s, −10° C. | Rating | B | B | D/B | D | D/B | D |
| INI, 23° C. | kJ/m$^2$ | 54 | 55 | 57 | 60 | 55 | 43 |
| INI, 0° C. | kJ/m$^2$ | 28 | 28 | 53 | 62 | 51 | 48 |
| INI, −5° C. | kJ/m$^2$ | 28 | 29 | 39 | 62 | 30 | 46 |
| INI, −10° C. | kJ/m$^2$ | 27 | 27 | 27 | 60 | 31 | 33 |
| IUnI, un-notched, 23° C. | kJ/m$^2$ | 230 | 221 | 214 | 191 | 216 | 201 |
| Flexural Modulus, 23° C. | MPa | 2035 | 2001 | 1870 | 1647 | 1886 | 1633 |
| Flexural Strength, 23° C. | MPa | 84 | 82 | 77 | 70 | 79 | 70 |
| Tensile modulus, 50, 23° C. | MPa | 2297 | 2299 | 2150 | 1872 | 2161 | 1954 |
| Tensile stress at break, 23° C. | MPa | 49 | 49 | 47 | 43 | 48 | 42 |
| Density | g/cm$^3$ | 1.08 | 1.08 | 1.07 | 1.06 | 1.07 | 1.08 |

[1]Parts were tested as molded and stored in a sealed aluminum bag without heat or moisture treatment prior to testing.

The data in Table 3 show that increased SEP-TP content with a corresponding lower amount of PPE (Ex2 and Ex3 vs. CEx1a and 1b) results in improved notched Izod impact strength and higher ductility in MAI impact testing at various negative temperatures. However, the HDT decreases with the increase in SEP-TP content and lower PPE content.

A moderate improvement in notched Izod impact strength at −5 and −10° C. as well as MAI impact testing at −10° C. is seen in Ex3 (ratio of SEP to SEBS=11 to 4) and Ex4 (ratio of SEP to SEB=15 to 0) vs. CEx1a and 1b (ratio of SEP to SEBS=8:7). The SEP-TP appears to be a more effective impact modifier for low temperature impact performance than SEBS-HMW. It can also be seen that substituting SEP for SEBS in the base CEx1a and 1b composition reduces tensile modulus and flex modulus, and provides a slightly lower heat distortion temperature at the 0.45 MPa stress.

Examples 1 and 6-11

In these examples, different types impact modifiers were tested in various amounts as a replacement for polyamide in a PPE/polyamide base composition, to determine their effect on low-temperature impact strength and other properties. The rubber impact modifiers tested included two hydrogenated polybutadiene rubbers (a lower styrene content hydrogenated polystyrene-poly(ethylene-propylene) diblock copolymer (SEP-TP), a higher styrene content hydrogenated polystyrene-poly(ethylene-propylene) diblock copolymer (SEP-HS), and three core-shell rubbers (MBS-1, MBS-2, and a silicone-acrylate). Compositions and properties are shown in Table 4.

TABLE 4

| Component | Unit | CEx1c | Ex6 | Ex7 | Ex8 | Ex9 | Ex 10 | Ex11 |
|---|---|---|---|---|---|---|---|---|
| PPE | pbw | 35.6 | 35.6 | 35.6 | 35.6 | 35.6 | 35.6 | 35.6 |
| PA66-P | pbw | 48 | 48 | 48 | 48 | 48 | 41 | 41 |
| SEP-HS | pbw | 8 | 8 | 8 | 8 | 8 | | 15 |
| SEBS-HMW | pbw | 7 | 7 | 7 | 7 | 7 | 7 | 7 |
| SEP-TP | pbw | | | | | | 15 | |
| MBS-1 | pbw | | 5 | 10 | | | | |
| MBS-2 | pbw | | | | 5 | | | |
| Silicone-acrylic | pbw | | | | | 5 | | |
| PETS | pbw | 0.3 | 0.3 | 0.3 | 0 | 0.3 | 0.3 | 0.3 |
| CuI | pbw | 0.01 | 0.01 | 0.01 | 0.01 | 0.01 | 0.01 | 0.01 |
| CAA | pbw | 0.7 | 0.7 | 0.7 | 0.7 | 0.7 | 0.7 | 0.7 |
| AO | pbw | 0.3 | 0.3 | 0.3 | 0.3 | 0.3 | 0.3 | 0.3 |
| KI | pbw | 0.15 | 0.15 | 0.15 | 0.15 | 0.15 | 0.15 | 0.15 |
| Properties[1] | | CE3 | 30 | 31 | 32 | 33 | 34 | 35 |
| HDT, 0.45 MPa | ° C. | 179 | 172 | 166 | 174 | 178 | 174 | 170 |
| MAI, 3.3 m/s, 23° C. | Rating | D | D | D | D | D | D | D |
| MAI, 3.3 m/s, −10° C. | Rating | B | B | B | B | B | D | D |
| MAI, 3.3 m/s, −15° C. | Rating | B | | | | | D | D |
| MAI, 3.3 m/s, −20° C. | Rating | B | | | | | D | D |
| MAI, 3.3 m/s, −25° C. | Rating | B | | | | | D | D |
| MAI, 3.3 m/s, −30° C. | Rating | B | | | | | D/B | D/B |
| INI, 23° C. | MPa | 55 | 21 | 14 | 24 | 28 | 60 | 59 |
| INI, −10° C. | MPa | 26 | 18 | 12 | 25 | 25 | 55 | 56 |
| INI, −20° C. | MPa | 26 | 17 | 11 | 23 | 26 | 53 | 54 |
| Tensile modulus, −10° C. | MPa | 2586 | 2421 | 2318 | 2420 | 2414 | 2077 | 2496 |
| Tensile stress at break, −10° C. | MPa | 62 | 61 | 58 | 59 | 61 | 53 | 63 |
| Flexural modulus, −10° C. | MPa | 2159 | 2082 | 1929 | 1962 | 2000 | 1761 | 1851 |
| Flexural strength, −10° C. | MPa | 98 | 86 | 79 | 84 | 83 | 70 | 76 |
| Density | g/cm³ | 1.08 | 1.07 | 1.07 | 1.07 | 1.07 | 1.05 | 1.06 |

[1]Parts were tested as molded and stored in a sealed aluminum bag without heat or moisture treatment prior to testing.

The low notched Izod impact strength at −10° C. and −20° C., as well as the brittle behavior in MAI impact testing at 23° C. and −10° C. seen in Ex6, Ex7, and Ex8 show that the core-shell impact modifiers are not effective to improve low temperature impact performance compared to CEx1c.

A comparison of the low temperature impact properties of Ex11 (15 pbw SEP-HS) with Ex10 (15 pbw SEP-TP) shows there is little or no significant difference on low temperature impact performance. It is noted that the SEP-TP of Ex10 provides a slightly higher heat distortion temperature than the SEP-HS of Ex11. Without being bound by theory, it is believed that the lower polystyrene content in SEP-TP assists in maintaining a higher Tg in the PPE phase than does higher styrene content SEP-HS because polystyrene is miscible in PPE.

Moreover, the HDT of Ex10 and Ex11 in Table 4, where the impact modifier is substituted for the polyamide, is slightly higher than the HDT of Ex3 in Table 3, where the same amount of impact modifier is substituted for PPE.

A comparison of the low temperature impact properties of CEx1c (having a total rubber content 15 pbw and polyamide content of 48 pbw) with Ex10 and Ex11 (both having a total rubber content 22 pbw and polyamide 41 pbw) show that the ductile to brittle transition temperature in MAI impact testing improves from −5 to −25° C. for both Ex10 and Ex11. In addition, the notched Izod impact strength increases two-fold at −20° C.

In summary, the data presented in Tables 3 and 4 suggest that use of saturated polybutadiene-type impact modifiers result in articles with improved low temperature impact strength. It is preferred to have the saturated polybutadiene-type impact modifiers present in an amount of 15 pbw or more, or 18 pbw or more, or as high as 22 pbw. Moreover, the data suggests that by substituting the impact modifiers for polyamide, the articles exhibit improved heat resistance than a comparable substitution of the impact modifiers for PPE. Overall, both higher and lower styrene content impact modifiers are effective to improve low temperature impact performance, but the lower styrene content impact modifier (SEP-TP) better maintains heat resistance, as reflected by HDT.

Examples 1 and 12-15

Low temperature performance using the lower styrene content SEP-TP as an impact modifier was determined at different loadings. Ex13 and Ex14 include 22 pbw and 25 pbw of SEP-TP, respectively, and a corresponding content of polyamide-6,6 was reduced. Compositions and results are shown in Table 5.

TABLE 5

| Component | Unit | CEx1d | CEx12 | Ex13 | Ex14 | Ex15 |
|---|---|---|---|---|---|---|
| PPE | pbw | 35.6 | 35.8 | 35.6 | 35.6 | 38.6 |
| PA66-P | pbw | 48 | | 41 | 38 | 35 |
| PA66-HF | pbw | | 47.8 | | | |
| SEP-HS | pbw | 8 | 8 | | | |
| SEBS-HMW | pbw | 7 | 7 | | | |
| SEP-TP | pbw | | | 22 | 25 | 25 |
| PETS | pbw | 0.3 | 0.3 | 0.3 | 0.3 | 0.3 |
| CuI | pbw | 0.01 | 0.01 | 0.01 | 0.01 | 0.01 |
| CAA | pbw | 0.7 | 0.65 | 0.7 | 0.7 | 0.7 |
| AO | pbw | 0.3 | 0.3 | 0.3 | 0.3 | 0.3 |
| KI | pbw | 0.15 | 0.15 | 0.15 | 0.15 | 0.15 |

TABLE 5-continued

| Component | Unit | CEx1d | CEx12 | Ex13 | Ex14 | Ex15 |
|---|---|---|---|---|---|---|
| Properties | | | | | | |
| HDT[1], 0.45 MPa | ° C. | 177 | 178 | 167 | 164 | 166 |
| MAI[1], 3.3 m/s, −25° C. | Rating | B | B | D | D | B |
| MAI[1], 3.3 m/s, −30° C. | Rating | B | B | D | D | B |
| MAI[2], 3.3 m/s, −30° C. | Rating | | | | D | D |
| MAI[2], 3.3 m/s, −35° C. | Rating | | | | D | D |
| MAI[2], 3.3 m/s, −40° C. | Rating | | | | D | D |
| MAI[3], 3.3 m/s, −30° C. | Rating | B | | D | D | |
| MAI[3], 3.3 m/s, −35° C. | Rating | B | | D | D | |
| MAI[3], 3.3 m/s, −40° C. | Rating | B | | D | D/B | |
| INI[1], −30° C. | kJ/m² | 28 | 29 | 60 | 34 | 22 |
| Flexural modulus[1], 23° C. | MPa | 1940 | 1913 | 1371 | 1267 | 1277 |
| Flexural stress[1], 23° C. | MPa | 81 | 79 | 56 | 48 | 45 |
| Tensile modulus[1], 23° C. | MPa | 2162 | 2188 | 1496 | 1292 | 1308 |
| Tensile stress at break[1], 23° C. | MPa | 49 | 49 | 36 | 32 | 31 |
| Flexural modulus[1], −30° C. | MPa | 2198 | 2263 | 1652 | 1525 | 1571 |
| Flexural stress[1], −30° C. | MPa | 101 | 101 | 73 | 64 | 67 |
| Tensile modulus[1], −30° C. | MPa | 2519 | 2611 | 1817 | 1711 | 1672 |
| Tensile stress at break[1], −30° C. | MPa | 69 | 69 | 55 | 51 | 45 |

[1]Parts were tested as molded and stored in a sealed aluminum bag without heat or moisture treatment prior to testing.
[2]Prior to the testing, MAI disks were first treated for 40 hours at 40° C./95% relative humidity (RH), then for 144 hours (6 days) at 23° C./65% RH.
[3]Prior to the testing, MAI disks were stored in a pre-heated over at 200° C. for 45 mins to mimic e-coat process.

Ex13, containing 22 pbw SEP-TP, exhibits ductile behavior in MAI testing as low as −30° C. in the absence of moisture pre-treatment. Ductile behavior at −40° C. is observed with moisture pre-treatment. Moreover, a heat treatment of parts formed from Ex12 causes little or no further deterioration in ductile performance, as the parts remain ductile in MAI testing down to −40° C. following the heat treatment.

Ex14, containing 25 pbw SEP-TP by adjusting PA66-P to 38 pbw, provides no improvement in low temperature ductility in MAI testing compared to Ex13. Ex14 also exhibits significantly lower notched Izod impact strength (of 34 kJ/m² compared to Ex13 (60 kJ/m²). This result suggests that low polyamide content can lead to large PPE domain size and/or poor dispersion of impact modifiers in a PPE/polyamide blend. In fact, Ex15 has the same SEP-TP content as Ex14 with a still a further reduction in polyamide content to 35 pbw, and has a still lower notched Izod impact strength at −30° C. (22 kJ/m²) and brittle behavior in MAI testing at −25° C. compared to Ex 14.

Figure 2:
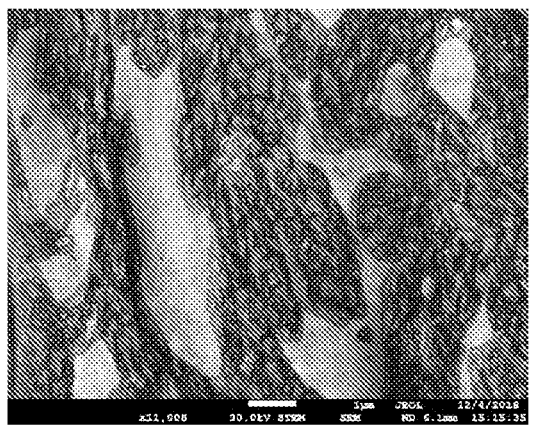
FIG. 2 is a STEM image of Example 15, containing 35 pbw of a polyamide-6,6 and 35.6 pbw of PPE.

STEM images in FIG. 1 (Ex14) and FIG. 2 (Ex15) show that as polyamide-6,6 concentration is reduced from 38 pbw to 35 pbw, the PPE domain sizes significantly increase, and the formation of a co-continuous phase with the polyamide is evident. Accordingly, in an aspect, it is preferred that polyamide concentration in the compositions be 38 pbw or more. It is more preferred that polyamide concentration is 41 pbw or more.

Examples 1 and 16-19

These examples investigate the effect of PPE-siloxane copolymer in comparison to the PPE (CEx1d and Ex16), and the effect of increased SEP-TP content/decreased PPO content with constant polyamide content (CEx1d and Ex17, Ex18, and Ex19). Compositions and results are shown in Table 6.

TABLE 6

| Component | Unit | CEx1e | Ex16 | Ex17 | Ex18 | Ex19 |
|---|---|---|---|---|---|---|
| PPE | pbw | 35.6 | | 35.6 | 32.6 | 29.6 |
| PPE-siloxane | pbw | | 35.6 | | | |
| PA66-P | pbw | 48 | 48 | 41 | 41 | 41 |
| SEP-TP | pbw | 15 | 15 | 22 | 25 | 28 |
| PETS | pbw | 0.3 | 0.3 | 0.3 | 0.3 | 0.3 |
| CuI | pbw | 0.01 | 0.01 | 0.01 | 0.01 | 0.01 |
| CAA | pbw | 0.7 | 0.7 | 0.7 | 0.7 | 0.7 |
| AO | pbw | 0.3 | 0.3 | 0.3 | 0.3 | 0.3 |
| KI | pbw | 0.15 | 0.15 | 0.15 | 0.15 | 0.15 |
| Properties[1] | | | | | | |
| Vic at rate A/50 | °C. | 245 | 218 | 239 | 238 | 238 |
| HDT, 0.45 MPa | °C. | 178 | 172 | 171 | 164 | 160 |
| MAI, 3.3 m/s, −30° C. | Rating | B | D | D | D | D |
| MAI, 3.3 m/s, −35° C. | Rating | B | D/B | D | D | D |
| MAI, 3.3 m/s, −40° C. | Rating | B | B | D | D | D |
| INI, −30° C. | kJ/m$^2$ | 29 | 40 | 53 | 58 | 61 |
| MFR, 280° C., 2.16 kg | g/10min | 4.1 | 2.5 | 1.7 | 1.4 | 1.6 |
| Tensile modulus, °C. | MPa | 1640 | 1410 | 1366 | 1267 | 1172 |
| Tensile stress at break, 23° C. | MPa | 43 | 38 | 38 | 36 | 33 |
| Density | g/cm$^3$ | 1.07 | 1.05 | 1.05 | 1.05 | 1.04 |

[1]Parts were tested as molded and stored in a sealed aluminum bag without heat or moisture treatment prior to testing.

As shown by the data for CEx1d and Ex16, the substitution of PPE-siloxane copolymer for PPE leads to higher notched Izod impact strength at −30° C., and better ductility at −30° C. and below in MAI testing. However, the substitution of PPE-siloxane copolymer also results in a reduction in heat resistance as seen by both lower Vicat softening temperature and HDT. The articles also exhibited some loss in tensile modulus. Ex16 also has lower melt flow than Ex37 at 280° C. with a load of 2.16 kg.

Notched Izod impact strength at −30° C. increases with increasing SEP-TP content (and the corresponding decrease in PPO content), as demonstrated in Ex17 (22 wt % SEP-TP), Ex18 (25 pbw), and Ex19 (28 pbw) respectively. A gradual reduction in HDT also occurs. Thus, an increased concentration of the impact modifier SEP-TP to 22 pbw or greater, with a corresponding reduction in PPE content, leads to improvement in low temperature impact performance, but decreased temperature resistance compared to CEx1d.

Examples 20-28

In these examples, other lower cost hydrogenated polybutadiene impact modifiers, in particular two SEBS and an SBS impact modifier were tested to determine efficacy compared to SEP-TP. Ex19 and Ex20, containing 15 pbw and 22 pbw of lower styrene content SEP ((SEP-TP)) respectively, were used as baseline compositions. Ex20 includes 15 pbw SEBS.

TABLE 7

| Component | Unit | Ex20 | Ex21 | Ex22 | CEx23 | CEx24 | CEx25 | CEx26 | CEx27 | CEx28 |
|---|---|---|---|---|---|---|---|---|---|---|
| PPE | pbw | 35.6 | 35.6 | 35.6 | 35.6 | 35.6 | 35.6 | 35.6 | 35.6 | 35.6 |
| PA66-P | pbw | 48 | 41 | 48 | 48 | 41 | 48 | 41 | 48 | 41 |
| SEP-TP | pbw | 15 | 22 | | | | | | | |
| SEBS-HMW | pbw | | | 15 | | | | | | |
| SEBS-1 | pbw | | | | | | 15 | 22 | | |
| SEBS-2 | pbw | | | | | | | | 15 | 22 |
| SBS | pbw | | | | 15 | 22 | | | | |
| PETS | pbw | 0.3 | 0.3 | 0.3 | 0.3 | 0.3 | 0.3 | 0.3 | 0.3 | 0.3 |
| CuI | pbw | 0.01 | 0.01 | 0.01 | 0.01 | 0.01 | 0.01 | 0.01 | 0.01 | 0.01 |
| CAA | pbw | 0.7 | 0.7 | 0.7 | 0.7 | 0.7 | 0.7 | 0.7 | 0.7 | 0.7 |
| AO | pbw | 0.3 | 0.3 | 0.3 | 0.3 | 0.3 | 0.3 | 0.3 | 0.3 | 0.3 |
| KI | pbw | 0.15 | 0.15 | 0.15 | 0.15 | 0.15 | 0.15 | 0.15 | 0.15 | 0.15 |
| Properties | Unit | 14 | 15 | 16 | 17 | 18 | 19 | 20 | 21 | 22 |
| HDT, 0.45 MPa | °C. | 177 | 172 | 187 | 172 | 161 | 180 | 172 | 176 | 168 |
| MAI, 3.3 m/s, −30° C. | rating | D/B | D | B | B | B | B | B | B | B |
| INI, 23° C. | kJ/m$^2$ | 61 | 61 | 59 | 28 | 27 | 54 | 62 | 52 | 60 |
| Tensile modulus, 23° C. | MPa | 1688 | 1370 | 1985 | 1988 | 1698 | 2048 | 1778 | 2132 | 1860 |
| Tensile strength at break, −30° C. | MPa | 43 | 38 | 50 | 55 | 50 | 51 | 46 | 51 | 47 |
| Density | g/cm$^3$ | 1.07 | 1.06 | 1.08 | 1.09 | 1.08 | 1.07 | 1.06 | 1.08 | 1.06 |

[1]Parts were tested as molded and stored in a sealed aluminum bag without heat or moisture treatment prior to testing.

The results in Table 7 show that alternative hydrogenated polybutadiene SEBS and SBS impact modifiers are not as effective to provide good low temperature impact properties, as demonstrated by brittle behavior in MAI impact testing at −30° C. The following experiments were designed to determine whether low temperature impact performance could be improved by modifying the polyamide phase of the PPE/polyamide blend. Polyamide-compatible impact modifiers of different types and in different amounts were studied.

Examples 1 and 29-33

These examples investigate the effect of using impact modifiers compatible with the polyamide. In Ex29 and Ex30, the impact modifier is an ionomer (DuPont Surlyn 8940). In Ex29, the ionomer and PPE was fed at the main feed throat with the other additives. In Ex30, the ionomer was fed at a downstream side feed with the polyamide.

These examples further investigate the effect of using different impact modifiers compatible with the polyamide, in particular an amorphous polyamide (IM-1) and two polyamide-compatibilized core-shell impact modifiers, an MBS-type (IM-2) and a silicone-acrylate-type (IM-3).

Compositions and testing results are shown in Table 8. As can be seen in Table 8, three comparative Examples (CEx1f, CEx1g, and CEx1h) having the same formulation were prepared and tested. Values obtained for each comparative Example were similar.

Table 8

TABLE 8

| Component | Unit | CEx1f | CEx1g | CEx1h | Ex29 | Ex30 | Ex31 | Ex32 | Ex33 |
|---|---|---|---|---|---|---|---|---|---|
| PPE | pbw | 35.6 | 35.6 | 35.6 | 35.6 | 35.6 | 35.6 | 35.6 | 35.6 |
| PA66-P | pbw | 48 | 48 | 48 | 48 | 48 | 48 | 48 | 48 |
| SEP-HS | pbw | 8 | 8 | 8 | 8 | 8 | 8 | 8 | 8 |
| SEBS-HMW | pbw | 7 | 7 | 7 | 7 | 7 | 7 | 7 | 7 |
| Ionomer | pbw | | | | 5 | 5 | | | |
| IM-1 (amorphous) | pbw | | | | | | 5 | | |
| IM-2 (core-shell) | pbw | | | | | | | 5 | |
| IM-3 (core shell) | pbw | | | | | | | | 5 |
| PETS | pbw | 0.3 | 0.3 | 0.3 | 0.3 | 0.3 | 0.3 | 0.3 | 0.3 |
| CuI | pbw | 0.01 | 0.01 | 0.01 | 0.01 | 0.01 | 0.01 | 0.01 | 0.01 |
| CAA | pbw | 0.7 | 0.7 | 0.7 | 0.7 | 0.7 | 1.0 | 0.7 | 0.7 |
| AO | pbw | 0.3 | 0.3 | 0.3 | 0.3 | 0.3 | 0.3 | 0.3 | 0.3 |
| KI | pbw | 0.15 | 0.15 | 0.15 | 0.15 | 0.15 | 0.15 | 0.15 | 0.15 |
| Properties[1] | | | | | | | | | |
| HDT, 0.45 MPa | ° C. | 183 | 179 | 179 | 174 | 178 | 174 | 179 | 174 |
| MAI, 3.3 m/s, 0° C. | Rating | D | D | | D | | | | |
| MAI, 3.3 m/s, −5° C. | Rating | D/B | D/B | | D | | | | |
| MAI, 3.3 m/s, −10° C. | Rating | B | B | B | D/B | B | B | B | B |
| INI, 23° C. | kJ/m$^2$ | 54 | 55 | 55 | 59 | 57 | 50 | 21 | 27 |
| INI, 0° C. | kJ/m$^2$ | 28 | 28 | | 45 | | | | |
| INI, −5° C. | kJ/m$^2$ | 28 | 29 | | 31 | | | | |
| INI, −10° C. | kJ/m$^2$ | 27 | 27 | 26 | 33 | 28 | 26 | 17 | 24 |
| INI, −20° C. | | | | 26 | | 27 | 27 | 16 | 23 |
| IUnI[2], 23° C. | kJ/m$^2$ | 230 | 221 | | 210 | | | | |
| Flexural Modulus, 23° C. | MPa | 2035 | 2001 | | 1776 | | | | |
| Flexural Strength, 23° C. | MPa | 84 | 82 | | 76 | | | | |
| Tensile modulus, 23° C. | MPa | 2297 | 2299 | | 1987 | | | | |
| Tensile stress at break, 23° C. | MPa | 49 | 49 | | 45 | | | | |
| Flexural modulus, −10° C. | | | | 2159 | | 1766 | 2186 | 1978 | 2058 |
| Flexural strength, −10° C. | | | | 98 | | 75 | 90 | 78 | 79 |
| Tensile stress at break, −10° C. | | | | 62 | | 61 | 62 | 60 | 55 |
| Tensile modulus, −10° C. | | | | 2586 | | 2478 | 2638 | 2437 | 2145 |
| Density | g/cm$^3$ | 1.08 | 1.08 | 1.08 | 1.07 | 1.07 | 1.08 | 1.07 | 1.07 |

[1]Parts were tested as molded and stored in a sealed aluminum bag without heat or moisture treatment prior to testing.

The data of Table 8 show that the addition of an ionomer as an impact modifier at the feed throat (Ex29) provides improved ductility at −5° C. in MAI impact testing compared to the CEx1f, g, and h. Ex29 also exhibits a moderate increase in notched Izod impact strength at various negative temperatures compared to CEx1f, g, and h. However, a reduction in HDT and tensile and flexural modulus is also observed in Ex29 compared to CEx1f, g, and h. Brittle behavior in MAI testing at −10° C. and low notched Izod impact strength at −10 and −20° C. shows that feeding the ionomer from a downstream side feeder (Ex30) is not as effective as feeding from the main feed throat (Ex29). Without being bound by theory, it is believed that feeding the ionomer at the main throat provides longer residence time in the extruder and likely provides a more complete reaction with the polyamide, i.e., ionic bonding of the ionic groups with the amine groups.

The compositions with 5 pbw of the other nonionic polyamide-compatible impact modifiers result in low notched Izod impact strength at negative temperatures and brittle behavior in MAI testing at −10° C. (Ex 31, Ex32, and Ex33) compared to CEx1f, g, and h.

Examples 1, 11, and 34-35

The effect of different amounts of an impact-modified polyamide-6,6 (PA66-IM, modified with EPDM) on thermal and mechanical properties upon was investigated. In both Ex34 and Ex35, 26 pbw of an impact-modified polyamide-6,6 was substituted in part for a low amine polyamide-6,6, which due to the EPDM content of this material, results adding approximately 5 pbw of EPDM in the polyamide phase. In Ex34, no low styrene SEP-TP impact modifier is present, and in Ex35, 15 pbw of SEP-TP is present. Compositions and testing results are shown in Table 9.

TABLE 9

| Component | Unit | CEx1i | CEx12b | Ex34 | Ex35 |
|---|---|---|---|---|---|
| PPE | pbw | 35.6 | 35.8 | 35.6 | 35.6 |
| PA66-P | pbw | 48 | | 22 | 15 |
| PA66-HF | pbw | | 47.8 | | |
| PA66-IM | pbw | | | 26 | 26 |
| SEP-HS | pbw | 8 | 8 | 8 | |
| SEBS-HMW | pbw | 7 | 7 | 7 | 7 |
| SEP-TP | pbw | | | | 15 |
| PETS | pbw | 0.3 | 0.3 | 0.3 | 0.3 |
| CuI | pbw | 0.01 | 0.01 | 0.01 | 0.01 |
| CAA | pbw | 0.7 | 0.65 | 0.7 | 0.7 |
| AO | pbw | 0.3 | 0.3 | 0.3 | 0.3 |
| KI | pbw | 0.15 | 0.15 | 0.15 | 0.15 |
| Properties[1] | pbw | | | | |
| HDT, 0.45 MPa | ° C. | 178 | 177 | 167 | 167 |
| MAI, 3.3 m/s, −10° C. | Rating | | B | B | D |
| MAI, 3.3 m/s, −15° C. | Rating | | B | B | D |
| INI, −30° C. | kJ/m² | 29 | 28 | 35 | 5 |
| Flexural modulus, 23° C. | MPa | 1913 | 1940 | 1618 | 1266 |
| Flexural stress, 23° C. | MPa | 79 | 81 | 65 | 44 |
| Tensile modulus, 23° C. | MPa | 2188 | 2162 | 1627 | 1376 |
| Tensile stress at break, 23° C. | MPa | 49 | 49 | 39 | 32 |
| Flexural modulus, −30° C. | MPa | 2263 | 2198 | 1786 | 1542 |
| Flexural stress, −30° C. | MPa | 101 | 101 | 80 | 62 |
| Tensile modulus, −30° C. | MPa | 2611 | 2519 | 2162 | 1729 |
| Tensile stress at break, −30° C. | MPa | 69 | 69 | 55 | 40 |

[1]Parts were tested as molded and stored in a sealed aluminum bag without heat or moisture treatment prior to testing.

The test results in Table 9 show that addition of an impact-modified polyamide-6,6 as in Ex34 and Ex35 lowers HDT and slightly reduces tensile and flexural modulus compared to CEx1i and CEx12b.

In addition, ductility down to −15° C. and notched Izod impact at −30° C. is improved by the addition of an impact-modified polyamide-6,6 (compare Ex34 with CEx12b). However, as shown in the results from Ex34 and 35, as the amount of impact modifier phase is increased even further (from 15 pbw to 22 pbw) and polyamide-6,6 is reduced from 22 pbw to 15 pbw, notched Izod impact at −30° C. falls from 35 kJ/m² to 5 kJ/m². Without being bound by theory, it is believed that a low amine end group concentration (from the lower amount of polyamide-6,6) results in poorer compatibilization.

Results from Tables 8 and 9 show that an ionomer or an EPDM-impact modified polyamide are effective to provide low temperature impact properties. The EPDM-impact modified polyamide is preferred.

Examples 1 and 36-37

The following set of experiments are directed to optimizing PPE/polyamide compatibilization to improve low temperature impact performance. In Example 36, the concentration of citric acid was increased to 1 pbw, compared to 0.7 pbw used in CEx1j. In Example 37, fumaric acid at a concentration of 0.7 pbw was substituted for citric acid. Compositions and testing results are shown in Table 10.

TABLE 10

| Component | Unit | CEx1j | Ex36 | Ex37 |
|---|---|---|---|---|
| PPE | pbw | 35.6 | 35.6 | 35.6 |
| PA66-P | pbw | 48 | 48 | 48 |
| SEP-HS | pbw | 8 | 8 | 8 |
| SEBS-HMW | pbw | 7 | 7 | 7 |
| PETS | pbw | 0.3 | 0.3 | 0.3 |
| CuI | pbw | 0.01 | 0.01 | 0.01 |
| CAA | pbw | 0.7 | 1 | |
| AO | pbw | 0.3 | 0.3 | 0.3 |
| KI | pbw | 0.15 | 0.15 | 0.15 |
| FA | pbw | | | 0.7 |
| Properties[1] | pbw | | | |
| HDT, 0.45 MPa | ° C. | 183 | 179 | 182 |
| MAI, 3.3 m/s, 0° C. | Rating | D | B | B |
| MAI, 3.3 m/s, −5° C. | Rating | D/B | B | B |
| MAI, 3.3 m/s, −10° C. | Rating | B | B | B |
| INI, 23° C. | kJ/m² | 54 | 52 | 26 |
| INI, 0° C. | kJ/m² | 28 | 26 | 26 |
| INI, −5° C. | kJ/m² | 28 | 27 | 27 |
| INI, −10° C. | kJ/m² | 27 | 26 | 26 |
| Izod impact strength, unnotched | kJ/m² | 230 | 227 | 227 |
| Flexural modulus, 23° C. | MPa | 2035 | 1998 | 1998 |
| Flexural stress, 23° C. | MPa | 84 | 82 | 79 |
| Tensile modulus, 23° C. | MPa | 2297 | 2303 | 2308 |
| Tensile stress at break, 23° C. | MPa | 49 | 49 | 50 |
| Flexural modulus, −30° C. | MPa | 1.08 | 1.07 | 1.06 |
| Density | g/cm³ | 183 | 179 | 182 |

[1]Parts were tested as molded and stored in a sealed aluminum bag without heat or moisture treatment prior to testing.

The test results shown in Table 10 show that using a higher citric acid concentration (i.e., 1 pbw vs. 0.7 pbw) does not provide improved MAI or INI properties at various temperatures. Additionally, the date in Table 10 shows that when fumaric acid was substituted for citric acid, inferior low temperature properties were noted related to CEx1j. So neither high CAA nor FA loading appears to improve low temperature impact performance.

The following set of experiments are directed to optimizing compatibilization of the PPE and polyamide phases of the PPE/polyamide blend. The amine end group concentration in the polyamide in particular were studied.

Examples 12 and 38-39

Compositions containing PPE and various polyamides are shown in Table 11. CEx1 includes a high-flow polyamide (PA66-HF). Ex38 includes 5 pbw of a high amine polyamide (PA6-HA, 90-110 meq/g), which partly substitutes for a lower amine polyamide (PA66-P, 52-56 meq/g). Ex39 includes 15% of the high amine polyamide PA66-HA, which also partly substitutes for the lower amine polyamide. Results are also shown in Table 11.

TABLE 11

| Component | Unit | CEx12c | Ex38 | Ex39 |
|---|---|---|---|---|
| PPE | pbw | 35.8 | 35.6 | 35.6 |
| PA66-P | pbw |  | 43 | 33 |
| PA66-HF | pbw | 47.8 |  |  |
| PA6-HA | pbw |  | 5 | 15 |
| SEP-HS | pbw | 8 | 8 | 11 |
| SEBS-HMW | pbw | 7 | 7 | 4 |
| PETS | pbw | 0.3 | 0.3 | 0.3 |
| CuI | pbw | 0.01 | 0.01 | 0.01 |
| CAA | pbw | 0.65 | 0.7 | 0.7 |
| KI | pbw | 0.15 | 0.15 | 0.15 |
| AO | pbw | 0.3 | 0.3 | 0.3 |
| Properties[1] |  |  |  |  |
| HDT, 0.45 MPa | °C. | 177 | 176 | 171 |
| MAI, 3.3 m/s, −10° C. | % | B | D/B | D |
| MAI, 3.3 m/s, −15° C. | % | B | D/B | D |
| INI, −30° C. | kJ/m$^2$ | 28 | 37 | 45 |
| Flexural modulus, 23° C. | MPa | 1940 | 1920 | 1804 |
| Flexural stress, 23° C. | MPa | 81 | 81 | 76 |
| Tensile modulus, 23° C. | MPa | 2162 | 2129 | 2022 |
| Tensile strength at break, 23° C. | MPa | 49 | 49 | 46 |
| Flexural modulus, −30° C. | MPa | 2198 | 2189 | 2099 |
| Flexural stress, −30° C. | MPa | 101 | 100 | 96 |
| Tensile modulus, −30° C. | MPa | 2519 | 2545 | 2525 |
| Tensile strength at break, −30° C. | MPa | 69 | 68 | 66 |

[1]Parts were tested as molded and stored in a sealed aluminum bag without heat or moisture treatment prior to testing.

Figure 3:
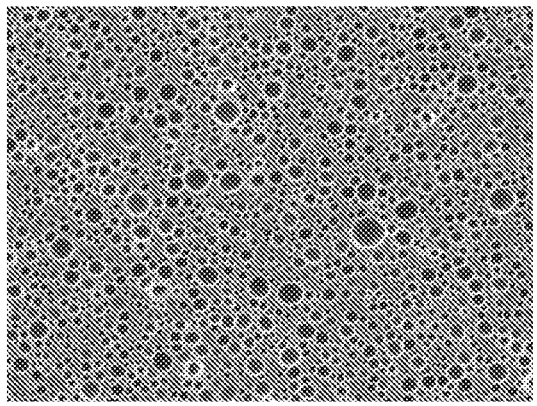
FIG. 3 is a STEM image of comparative Example 12, showing a volume weighted mean of PPE domain size of 1.39 micrometers (μm).
Figure 4:
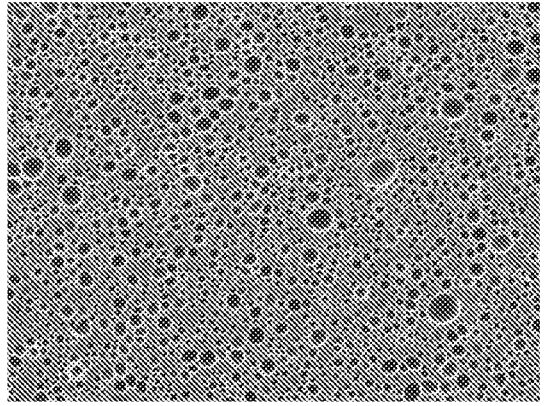
FIG. 4 is STEM image of Example 37, showing a volume weighted mean of PPE domain size of 1.25 μm.

The results in Table 11 demonstrate that increasing the content of a high amine content polyamide-6 (up to 15 pbw) as in Ex 38 and Ex 39, leads to better low temperature impact performance, as shown by more ductility in MAI impact testing at −10 and −15° C., and by higher impact strength measured in notched Izod impact testing at −30° C., compared to CEx12. Without being bound by theory, it is believed that the high amine content polyamide-6 improves compatibilization of PPE-polyamide blends. This can be further seen in FIG. 3, which shows that CEx12c has a volume weighted mean of PPE domain size of 1.39 μm, and FIG. 4, which shows that Ex39 has a volume weighted mean of PPE domain size of 1.25 μm, where the decreased domain size reflects improved compatibility. Loss in HDT and slightly reduced tensile and flexural modulus at both room temperature (23° C.) and −30° C. were also observed with addition of high amine polyamide-6.

Examples 40-46

The effect of increasing high amine polyamide-6 alone and/or the low styrene content SEP (SEP-TP) on impact performance at low temperatures, e.g., less than 0° C., was investigated. Ex40, containing 48 pbw of the lower amine polyamide (52-56 meq/g) and 15 pbw of the SEP- was used as the baseline. Ex41 had the SEP-TP increased to 22 pbw and lower amine polyamide-6,6 adjusted to 41 pbw. In Ex42, Ex43, and CEx44, the lower amine content polyamide-6,6 was substituted in part with the high amine content polyamide-6 (15 pbw, 30 pbw, and 48 pbw, respectively), with the total polyamide loading maintained at 48 pbw. Ex44 and Ex46 had high amine PA-6 maintained at 15 pbw, while the SEP-TP was increased to 18 pbw and 22 pbw, respectively, and the total polyamide loading adjusted to 45 pbw and 41 pbw, respectively. The compositions and test results are also shown in Table 12.

TABLE 12

| Component | Unit | Ex40 | Ex41 | Ex42 | Ex43 | CEx44 | Ex45 | Ex46 |
|---|---|---|---|---|---|---|---|---|
| PPE | pbw | 35.6 | 35.6 | 35.6 | 35.6 | 35.6 | 35.6 | 35.6 |
| PA66-P | pbw | 48 | 41 | 33 | 18 |  | 30 | 26 |
| SEP-TP | pbw | 15 | 22 | 15 | 15 | 15 | 18 | 22 |
| PA6-HA | pbw |  |  | 15 | 30 | 48 | 15 | 15 |
| PETS | pbw | 0.3 | 0.3 | 0.3 | 0.3 | 0.3 | 0.3 | 0.3 |
| CuI | pbw | 0.01 | 0.01 | 0.01 | 0.01 | 0.01 | 0.01 | 0.01 |
| CAA | pbw | 0.7 | 0.7 | 0.7 | 0.7 | 0.7 | 0.7 | 0.7 |
| KI | pbw | 0.15 | 0.15 | 0.15 | 0.15 | 0.15 | 0.15 | 0.15 |
| AO | pbw | 0.3 | 0.3 | 0.3 | 0.3 | 0.3 | 0.3 | 0.3 |
| Properties[1] |  |  |  |  |  |  |  |  |
| Vicat | °C. | 245 | 239 | 228 | 214 | 210 | 224 | 218 |
| HDT, 0.45 MPa | °C. | 178 | 171 | 172 | 165 | 164 | 166 | 164 |
| HDT, 1.8 MPa | °C. | 83 | 83 | 75 | 68 | 71 | 71 | 79 |
| MAI, 3.3 m/s, −30° C. | % | D/B | D | D | D | D | D | D |
| MAI, 3.3 m/s, −35° C. | % | B | D | D | D | D/B | D | D |
| MAI, 3.3 m/s, −40° C. | % | B | D | D/B | D/B | D/B | D/B | D |
| INI, −30° C. | kJ/m$^2$ | 29 | 53 | 43 | 53 | 36 | 56 | 59 |
| MFR, 280° C., 2.16 kg | g/10 min | 4.1 | 1.7 | 3 | 4 | 4 | 2 | 1 |
| Tensile modulus, 23° C. | MPa | 1640 | 1366 | 1595 | 1548 | 1597 | 1473 | 1410 |
| Tensile stress at break, 23° C. | MPa | 43 | 38 | 42 | 39 | 39 | 39 | 38 |
| Density | g/cm$^3$ | 1.07 | 1.05 | 1.07 | 1.07 | 1.07 | 1.06 | 1.05 |

[1]Parts were tested as molded and stored in a sealed aluminum bag without heat or moisture treatment prior to testing.

As shown in Table 12, substitution (in part) of the high amine polyamide-6 for the lower amine polyamide-6,6 up to 30 pbw, promotes low temperature impact performance (compare Ex40 and Ex41 with Ex42 and Ex43). However, further increasing high amine polyamide-6 to 48 pbw in CEx44 results in inferior notched Izod impact strength at −30° C. as compared to 15 wt and 30 pbw (Ex42 and Ex43, respectively). Defects on the surface of molded parts (markings with white stripes) were also observed for Ex43 and CEx44 (high amine polyamide-6 loading at 30 pbw and 48 pbw). These data show that it is preferred to add high amine polyamide-6 to promote low temperature impact. It is more preferred to add high amine polyamide-6 in an amount of less than 30 pbw, for example 15 pbw.

In addition, Ex45, with 15 pbw high amine polyamide-6 and 3 pbw less SEP-TP than Ex41, exhibits similar low temperature impact performance to Ex40 with no high amine polyamide-6, as reflected in notched Izod impact strength at −30° C. and MAI impact testing at various negative temperatures. Ex43 demonstrates that a formulation with addition of high amine polyamide-6 and less SEP-TP can achieve a low temperature impact performance similar to that of a formulation with no high amine polyamide-6 and a higher SEP-TP loading. Since SEP-TP is generally higher-cost than high amine polyamide-6, this feature represents an alternative low-cost solution to use of high-polystyrene SEP formulations.

Ex46, with both 15 pbw of high amine polyamide-6 and 22 pbw SEP-TP exhibits even more improved low temperature impact performance compared to Ex45 and Ex41, as demonstrated by higher notched Izod impact strength at −30° C. and higher ductility in MAI impact testing at various negative temperatures.

The results in Table 12 accordingly demonstrate that use of up to 30 pbw of a high amine polyamide-6 promotes low temperature impact performance, which can be improved even further with use of a low polystyrene SEP.

Examples 1, 12 and 47-49

The following examples were designed to determine the effect of modifying impact by use of high amine polyimide-6, an impact-modified polyamide-6,6 (PA66-IM), and high levels of a low styrene SEP (SEP-TP). CEx1k and CEx12d, containing none of these impact modifiers, were used for baseline performance. Ex47 includes 22 pbw of SEP-TP, and the low amine polyamide-6,6 (PA66-P) was adjusted to 41 pbw. Ex 48 includes 22 pbw SEP-TP, and the low amine polyamide-6,6 was replaced with 26 pbw of the impact-modified PA-6,6 (PA66-IM) and 15 wt % of high amine polyamide-6. Ex49 had the same SEP-TP content as Ex45, and 15 pbw of the low amine PA66-P was replaced in part with high amine polyamide-6. Compositions and results are shown in Table 13.

TABLE 13

| Component | Unit | CEx1k | CEx12d | 47 | 48 | 49 |
| --- | --- | --- | --- | --- | --- | --- |
| PPE | pbw | 35.6 | 35.8 | 35.6 | 35.6 | 35.6 |
| PA66-P | pbw | 48 | | 41 | | 26 |
| PA66-HF | pbw | | 47.8 | | | |
| PA6-HA | pbw | | | | 15 | 15 |
| PA66-IP | pbw | | | | 26 | |
| SEP-HS | pbw | 8 | 8 | | | |
| SEP-TP | pbw | | | 22 | 15 | 15 |
| SEBS-HMW | pbw | 7 | 7 | | 7 | 7 |
| PETS | pbw | 0.3 | 0.3 | 0.3 | 0.3 | 0.3 |
| CuI | pbw | 0.01 | 0.01 | 0.01 | 0.01 | 0.01 |
| CAA | pbw | 0.7 | 0.65 | 0.7 | 0.7 | 0.7 |
| AO | pbw | 0.3 | 0.3 | 0.3 | 0.3 | 0.3 |
| KI | pbw | 0.15 | 0.15 | 0.15 | 0.15 | 0.15 |
| Properties | | | | | | |
| HDT[1], 0.45 MPa | °C. | 178 | 177 | 167 | 162 | 167 |
| MAI[1], 3.3 m/s, −25° C. | Rating | B | B | D | D | D |
| MAI[1], 3.3 m/s, −30° C. | Rating | | B | D | D | D |
| MAI[1], 3.3 m/s, −35° C. | Rating | | B | D | D/B | D |
| MAI[2], 3.3 m/s, −30° C. | Rating | | B | D | D | D |
| MAI[2], 3.3 m/s, −35° C. | Rating | | B | D | D/B | D |
| MAI[2], 3.3 m/s, −40° C. | Rating | | B | D | D/B | D/B |
| MAI[3], 3.3 m/s, −30° C. | Rating | | B | D | D | D |
| MAI[3], 3.3 m/s, −35° C. | Rating | | B | D | D/B | D |
| MAI[3], 3.3 m/s, −40° C. | Rating | | B | D | D/B | D/B |
| INI[1], −30° C. | kJ/m² | 29 | 28 | 60 | 35 | 67 |
| Flexural modulus[1], 23° C. | MPa | 1913 | 1940 | 1371 | 1205 | 1432 |
| Flexural stress[1], 23° C. | MPa | 79 | 81 | 56 | 44 | 61 |
| Tensile modulus[1], 23° C. | MPa | 2188 | 2162 | 1496 | 1351 | 1619 |
| Tensile strength at break[1], 23° C. | MPa | 49 | 49 | 36 | 34 | 40 |
| Flexural modulus[1], −30° C. | MPa | 2263 | 2198 | 1652 | 1443 | 1729 |
| Flexural stress[1], −30° C. | MPa | 101 | 101 | 73 | 66 | 77 |
| Tensile modulus[1], −30° C. | MPa | 2611 | 2519 | 1817 | 1786 | 1989 |
| Tensile strength at break[1], −30° C. | MPa | 69 | 69 | 55 | 47 | 57 |

[1]Parts were tested as molded and stored in a sealed aluminum bag without heat or moisture treatment prior to testing.
[2]Prior to the testing, MAI disks were treated first for 40 hours at 40° C./95% relative humidity (RH), then for 144 hours (6 days) at 23° C./65% RH.
[3]Prior to the testing, MAI disks were stored in a pre-heated over at 200° C. for 45 mins to mimic e-coat process.

As shown in Table 13, Ex47, Ex48, and Ex49 exhibit lower HDT, reduced tensile modulus, and reduced flexural modulus compared to CEx1k and CEx12d. Ex48 exhibits the lowest HDT of the three examples.

E-coating capability of these compositions were assessed by a lab simulated process, wherein mini-honeycomb-shaped parts molded from each composition were left in a heated oven at 200° C. for 30 mins and dimensional stability was evaluated via three-dimensional (3D) scanning before and after the heat treatment. Mini-honeycomb parts molded with the compositions of Ex47, Ex48, and Ex49 did not show excessive deformation and dimensional change as determined by 3D scanning, and these results are comparable to a molded part using CE1. Accordingly, the thermal data suggest that parts molded from the compositions of Ex47, Ex48, and Ex49 have good heat resistance and are acceptable for e-coating.

The notched Izod impact strength of Ex47 and Ex49 at –30° C. was each over 60 kJ/m$^2$, whereas notched Izod impact strength of Ex48 is significantly lower (35 kJ/m$^2$). This value roughly comparable to both CEx1k and CEx12d. Moreover, MAI testing shows that each of Ex47, Ex48, and Ex49 are more ductile than CEx1k and CEx12d at low temperatures, down to –40° C. Ex47 and Ex49 are more ductile than Ex48 at temperatures lower than 30° C.

In summary, these results show that in a PPE matrix/dispersed phase polyamide blend, excellent low temperature impact properties can be obtained using 18 pbw or more, preferably 22 pbw or more, of a low styrene content SEP; or less than 30 pbw, preferably less than 15 pbw of a high amine polyamide; or 26 pbw of an EPDM-modified polyamide; or a combination of the foregoing.

This disclosure further encompasses the following aspects.

Aspect 1: A composition, comprising: 35 to 55 weight percent of a poly(phenylene ether), a poly(phenylene ether-siloxane), or a combination thereof; 35 to 65 weight percent of a polyamide composition, wherein the polyamide composition comprises at least one polyamide having an amine end group content of less than 75 milliequivalents per gram; 10 to 30 weight percent, preferably 14 to 24 weight percent, of a polystyrene-poly(ethylene-propylene) diblock copolymer impact modifier, or a polystyrene-poly(ethylene-butylene)-polystyrene triblock copolymer impact modifier, or a combination thereof, and optionally 20 to 30 weight percent of an ethylene-propylene-diene monomer-modified polyamide, or 5 to 20 weight percent of a polyamide having an amine end group content of 75 to 140 milliequivalents per gram, as a part of the polyamide composition, or a combination thereof; wherein each amount is based on 100 weight percent of the composition.

Aspect 2: The composition of aspect 1, wherein the polystyrene-poly(ethylene-propylene) diblock copolymer impact modifier has a styrene content 20 to 35 weight percent, or 25 to 30 weight percent.

Aspect 3: The composition of any one of the preceding aspects, wherein the ethylene-propylene-diene monomer-modified polyamide is present in an amount of 24 to 30 weight percent based on 100 weight percent of the composition.

Aspect 4: The composition of any one of the preceding aspects, wherein the polyamide having an amine end group content of 75 to 120 milliequivalents per gram is present, and accounts for 20 to 40 weight percent, preferably 20 to 35 weight percent, more preferably 20 to 30 weight percent, of all the polyamide in the composition.

Aspect 5: The composition of any one of the preceding aspects, wherein the ethylene-propylene-diene monomer-modified polyamide is present, and the composition comprises 2 to 10 weight percent, preferably 3 to 8 weight percent, of the ethylene-propylene-diene monomer impact modifier.

Aspect 6: The composition of any of the preceding aspects, comprising: 30 to 40 weight percent, preferably 32 to 38 weight percent, more preferably 33 to 36 weight percent, of the poly(phenylene ether); 38 to 54 weight percent, preferably 40 to 48 weight percent, of a polyamide composition, wherein the polyamide composition comprises the polyamide having an amine end group content of less than 70 milliequivalents per gram and a polyamide having an amine end group content of 75 to 120 milliequivalents per gram; and 10 to 28 weight percent, preferably 14 to 24 weight percent, of the polystyrene-poly(ethylene-propylene) diblock copolymer impact modifier.

Aspect 7: The composition of any of the preceding aspects, comprising 33 to 37 weight percent of the poly(phenylene ether), 42 to 50 weight percent, preferably 44 to 48 weight percent, of the polyamide composition, and the polyamide having an amine end group content of 75 to 120 milliequivalents per gram is present in an amount 8 to 35 weight percent, preferably 12 to 26 weight percent, and 12 to 24 weight percent, preferably 15 to 22 weight percent, of the polystyrene-poly(ethylene-propylene) diblock copolymer impact modifier.

Aspect 8: The composition of aspect 6 or aspect 7, wherein the ethylene-propylene-diene monomer-modified polyamide is present, and the composition comprises 2 to 10 weight percent, preferably 3 to 8 weight percent, of the ethylene-propylene-diene monomer impact modifier.

Aspect 9: The composition of any one of aspects 6 to 8, wherein a molded sample of the composition has at least one of the following properties: a heat distortion temperature from 164° C. to 180° C., measured in accordance with ISO 75 at 1.8 MPa; an Izod notched impact strength from 32 kJ/m$^2$ to 64 kJ/m$^2$, preferably from 40 kJ/m$^2$ to 60 kJ/m$^2$, measured in accordance with ISO 180 at –30° C.; a tensile modulus of 2100 MPa to 2600 MPa measured in accordance with ISO 527 at –30° C.; or ductility as measured in accordance with ASTM D2763 at 3.3 m/s at –30° C., where the molded sample is treated for 40 hours at 40° C./95% relative humidity then for 144 hours at 23° C./65% relative humidity.

Aspect 10: The composition of any one of aspects 1 to 5, comprising: 30 to 40 weight percent, preferably 32 to 38 weight percent, more preferably 33 to 36 weight percent, of the poly(phenylene ether); 40 to 50 weight percent, preferably 42 to 48 weight percent of the polyamide composition; 10 to 28 weight percent, preferably 14 to 24 weight percent, of the polystyrene-poly(ethylene-propylene) diblock copolymer impact modifier; and 2 to 10 weight percent, preferably 3 to 8 weight percent, of an ethylene propylene diene monomer impact modifier.

Aspect 11: The composition of aspect 10, wherein the polyamide composition comprises at least two different polyamides, wherein one polyamide has an amine content of less than 75 milliequivalents, and another polyamide has an amine content of 75 to 140 milliequivalents per gram, preferably an amine content of 85 to 120 milliequivalents per gram.

Aspect 12: The composition of any one of aspects 10 to 11, wherein a molded sample of the composition has at least one of the following properties: a heat distortion temperature from 164° C. to 174° C., measured in accordance with ISO 75 at 1.8 MPa; an Izod notched impact strength from 45 to 70 kJ/m², preferably from 55 to 70 kJ/m², measured in accordance with ISO 180 at −30° C.; a tensile modulus of 1700 to 2200 MPa measured in accordance with ISO 527 at −30° C.; or ductility as measured in accordance with ASTM D2763 at 3.3 m/s at −30° C., where the molded sample is treated for 40 hours at 40° C./95% relative humidity then for 144 hours at 23° C./65% relative humidity.

Aspect 13: An article formed from the composition of any one of the preceding aspects.

Aspect 14: The article of aspect 13, as a molded part for passenger transport vehicles, commercial vehicle equipment, or commercial or residential units.

Aspect 15: A method of forming the composition of any of aspects 1 to 12, the method comprising: combining the components of the composition.

All ranges disclosed herein are inclusive of the endpoints, and the endpoints are independently combinable with each other. Each range disclosed herein constitutes a disclosure of any point or sub-range lying within the disclosed range. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. Reference throughout the specification to "another aspect", "an aspect", and so forth, means that a particular element (e.g., feature, structure, and/or characteristic) described in connection with the aspect is included in at least one aspect described herein, and may or may not be present in other aspects. In addition, it is to be understood that the described elements may be combined in any suitable manner in the various aspects.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition, comprising:
   30 to 40 weight percent of a poly(phenylene ether), a poly(phenylene ether-siloxane), or a combination thereof;
   35 to 65 weight percent of a polyamide composition, wherein the polyamide composition comprises at least one polyamide having an amine end group content of less than 75 milliequivalents per gram;
   10 to 30 weight percent of a polystyrene-poly(ethylene-propylene) diblock copolymer impact modifier, or a polystyrene-poly(ethylene-butylene)-polystyrene triblock copolymer impact modifier, or a combination thereof, wherein the polystyrene-poly(ethylene-propylene) diblock copolymer impact modifier has a styrene content 20 to 35 weight percent;
   wherein each amount is based on 100 weight percent of the composition; and
   wherein no conductive fillers are present in the composition.

2. The composition of claim 1 further comprising ethylene-propylene-diene monomer-modified polyamide in an amount of 24 to 30 weight percent based on 100 weight percent of the composition.

3. The composition of claim 1 further comprising an ethylene-propylene-diene monomer-modified polyamide, and the composition comprises 2 to 10 weight percent of the ethylene-propylene-diene monomer impact modifier.

4. The composition of claim 3, wherein composition comprises 2 to 10 weight percent of the ethylene-propylene-diene monomer impact modifier.

5. The composition of claim 1, comprising:
   32 to 38 weight percent of the poly(phenylene ether);
   38 to 54 weight percent of a polyamide composition, wherein the polyamide composition comprises the polyamide having an amine end group content of less than 70 milliequivalents per gram and a polyamide having an amine end group content of 75 to 140 milliequivalents per gram; and
   10 to 28 weight percent of the polystyrene-poly(ethylene-propylene) diblock copolymer impact modifier.

6. The composition of claim 1, comprising
   33 to 37 weight percent of the poly(phenylene ether),
   42 to 50 weight percent of the polyamide composition, and a polyamide having an amine end group content of 75 to 120 milliequivalents per gram is present in an amount of 8 to 35 weight percent based on the weight of polyamide composition, and
   12 to 24 weight percent of the polystyrene-poly(ethylene-propylene) diblock copolymer impact modifier.

7. The composition of claim 1, comprising:
   30 to 40 weight percent of the poly(phenylene ether);
   40 to 50 weight percent of the polyamide composition;
   10 to 28 weight percent of the polystyrene-poly(ethylene-propylene) diblock copolymer impact modifier; and
   2 to 10 weight percent of an ethylene propylene diene monomer impact modifier.

8. An article formed from the composition of claim 1.

9. The article of claim 8, as a molded part for passenger transport vehicles, commercial vehicle equipment, or commercial or residential units.

10. A method of forming the composition of claim 1, the method comprising:
    melt-mixing the components of the composition.

11. A composition, comprising:
    35 to 55 weight percent of a poly(phenylene ether), a poly(phenylene ether-siloxane), or a combination thereof;
    35 to 65 weight percent of a polyamide composition, wherein the polyamide composition comprises at least one polyamide having an amine end group content of less than 75 milliequivalents per gram;
    10 to 30 weight percent of a polystyrene-poly(ethylene-propylene) diblock copolymer impact modifier, or a polystyrene-poly(ethylene-butylene)-polystyrene triblock copolymer impact modifier, or a combination thereof; and
    optionally:
      20 to 30 weight percent of an ethylene-propylene-diene monomer-modified polyamide, or
      5 to 20 weight percent of a polyamide having an amine end group content of 75 to 140 milliequivalents per gram, as a part of the polyamide composition, or
      a combination thereof;
    wherein each amount is based on 100 weight percent of the composition; and wherein the polyamide having an amine end group content of 75 to 140 milliequivalents per gram is present, and accounts for 20 to 40 weight percent of all the polyamide in the composition.

12. A composition, comprising:
    35 to 55 weight percent of a poly(phenylene ether), a poly(phenylene ether-siloxane), or a combination thereof;
    35 to 65 weight percent of a polyamide composition, wherein the polyamide composition comprises at least one polyamide having an amine end group content of less than 75 milliequivalents per gram;
    10 to 30 weight percent of a polystyrene-poly(ethylene-propylene) diblock copolymer impact modifier, or a polystyrene-poly(ethylene-butylene)-polystyrene triblock copolymer impact modifier, or a combination thereof; and
    optionally:
        20 to 30 weight percent of an ethylene-propylene-diene monomer-modified polyamide, or
        5 to 20 weight percent of a polyamide having an amine end group content of 75 to 140 milliequivalents per gram, as a part of the polyamide composition, or
        a combination thereof;
    wherein each amount is based on 100 weight percent of the composition; and wherein a molded sample of the composition has at least one of the following properties:
    a heat distortion temperature from 164° C. to 180° C., measured in accordance with ISO 75 at 1.8 MPa;
    an Izod notched impact strength from 32 kJ/m² to 64 KJ/m², measured in accordance with ISO 180 at −30° C.;
    a tensile modulus of 2100 MPa to 2600 MPa measured in accordance with ISO 527 at −30° C.; or
    ductility as measured in accordance with ASTM D2763 at 3.3 m/s at −30° C., where the molded sample is treated for 40 hours at 40° C./95% relative humidity then for 144 hours at 23° C./65% relative humidity.

13. A composition, comprising:
    35 to 55 weight percent of a poly(phenylene ether), a poly(phenylene ether-siloxane), or a combination thereof;
    35 to 65 weight percent of a polyamide composition, wherein the polyamide composition comprises at least one polyamide having an amine end group content of less than 75 milliequivalents per gram;
    10 to 30 weight percent of a polystyrene-poly(ethylene-propylene) diblock copolymer impact modifier, or a polystyrene-poly(ethylene-butylene)-polystyrene triblock copolymer impact modifier, or a combination thereof; and
    optionally:
        20 to 30 weight percent of an ethylene-propylene-diene monomer-modified polyamide, or
        5 to 20 weight percent of a polyamide having an amine end group content of 75 to 140 milliequivalents per gram, as a part of the polyamide composition, or
        a combination thereof;
    wherein each amount is based on 100 weight percent of the composition; and wherein the polyamide composition comprises at least two different polyamides, wherein one polyamide has an amine content of less than 75 milliequivalents, and another polyamide has an amine content of 75 to 140 milliequivalents per gram.

14. A composition, comprising:
    35 to 55 weight percent of a poly(phenylene ether), a poly(phenylene ether-siloxane), or a combination thereof;
    35 to 65 weight percent of a polyamide composition, wherein the polyamide composition comprises at least one polyamide having an amine end group content of less than 75 milliequivalents per gram;
    10 to 30 weight percent of a polystyrene-poly(ethylene-propylene) diblock copolymer impact modifier, or a polystyrene-poly(ethylene-butylene)-polystyrene triblock copolymer impact modifier, or a combination thereof; and
    optionally:
        20 to 30 weight percent of an ethylene-propylene-diene monomer-modified polyamide, or
        5 to 20 weight percent of a polyamide having an amine end group content of 75 to 140 milliequivalents per gram, as a part of the polyamide composition, or
        a combination thereof;
    wherein each amount is based on 100 weight percent of the composition; and wherein a molded sample of the composition has at least one of the following properties:
    a heat distortion temperature from 164° C. to 174° C., measured in accordance with ISO 75 at 1.8 MPa;
    an Izod notched impact strength from 45 to 70 KJ/m², measured in accordance with ISO 180 at −30° C.;
    a tensile modulus of 1700 to 2200 MPa measured in accordance with ISO 527 at −30° C.; or
    ductility as measured in accordance with ASTM D2763 at 3.3 m/s at −30° C., where the molded sample is treated for 40 hours at 40° C./95% relative humidity then for 144 hours at 23° C./65% relative humidity.

* * * * *